United States Patent
Ruhl et al.

(10) Patent No.: US 11,724,828 B2
(45) Date of Patent: Aug. 15, 2023

(54) DEPLOYABLE SYSTEM WITH FLEXIBLE MEMBRANE

(71) Applicant: M.M.A. DESIGN, LLC, Louiville, CO (US)

(72) Inventors: Lyn Eric Ruhl, Golden, CO (US); Mitchell Todd Wiens, Loveland, CO (US)

(73) Assignee: M.M.A. DESIGN, LLC, Louisville, CO (US)

( * ) Notice: Subject to any disclaimer, the term of this patent is extended or adjusted under 35 U.S.C. 154(b) by 608 days.

(21) Appl. No.: 16/748,471

(22) Filed: Jan. 21, 2020

(65) Prior Publication Data
US 2020/0231308 A1 Jul. 23, 2020

Related U.S. Application Data

(60) Provisional application No. 62/794,385, filed on Jan. 18, 2019.

(51) Int. Cl.
*B64G 1/22* (2006.01)
*B64G 1/64* (2006.01)
(Continued)

(52) U.S. Cl.
CPC .............. *B64G 1/222* (2013.01); *B64G 1/64* (2013.01); *B64G 1/443* (2013.01); *H04B 7/185* (2013.01)

(58) Field of Classification Search
CPC .......... B64G 1/222; B64G 1/64; B64G 1/443; B64G 1/641; B64G 1/44; B64G 1/66; H01Q 1/087; H01Q 1/288
See application file for complete search history.

(56) References Cited

U.S. PATENT DOCUMENTS

| | | |
|---|---|---|
| 3,010,372 A | 11/1961 | Lanford |
| 3,558,219 A | 1/1971 | Buckingham et al. |

(Continued)

FOREIGN PATENT DOCUMENTS

| | | |
|---|---|---|
| EP | 0957536 A1 | 11/1999 |
| EP | 1043228 B1 | 3/2003 |

(Continued)

OTHER PUBLICATIONS

International Searching Authority, United States Patent and Trademark Office, International Search Report and Written Opinion for Application No. PCT/US2020/014435, dated Apr. 16, 2022, 16 Pages.

(Continued)

*Primary Examiner* — Medhat Badawi
*Assistant Examiner* — Vicente Rodriguez
(74) *Attorney, Agent, or Firm* — Holzer Patel Drennan

(57) ABSTRACT

An example system for extraterrestrial deployment of a flexible membrane surface includes a flexible membrane having a periphery and an interior. The flexible membrane is rolled about a roll axis into a cylindrical geometric shape in an undeployed state. A payload base has extendable radial booms, wherein the distal end of each extendable radial boom is attached to the periphery of the flexible membrane and the interior of the flexible membrane is free of attachment to the extendable radial booms. The payload base and the extendable radial booms are positioned to one side of the flexible membrane along the roll axis. The extendable radial booms are configured to extend orthogonally to the roll axis from the payload base to unroll the flexible membrane about the roll axis to form the flexible membrane surface in a deployed state, wherein the roll axis is substantially orthogonal to the flexible membrane surface.

35 Claims, 23 Drawing Sheets

(51) Int. Cl.
  *B64G 1/44* (2006.01)
  *H04B 7/185* (2006.01)

(56) References Cited

U.S. PATENT DOCUMENTS

| | | | |
|---|---|---|---|
| 3,848,821 | A | 11/1974 | Scheel |
| 4,030,102 | A | 6/1977 | Kaplan et al. |
| 4,133,501 | A | 1/1979 | Pentlicki |
| 4,375,878 | A | 3/1983 | Harvey |
| 5,040,907 | A | 8/1991 | Harvey |
| 5,189,773 | A | 3/1993 | Harvey |
| 5,228,644 | A | 7/1993 | Garriott |
| 5,296,044 | A | 3/1994 | Harvey |
| 5,298,085 | A | 3/1994 | Harvey |
| 5,365,241 | A | 11/1994 | Williams |
| 5,520,747 | A | 5/1996 | Marks |
| 5,644,322 | A | 7/1997 | Hayes |
| 5,785,280 | A | 7/1998 | Baghdasarian |
| 6,010,096 | A | 1/2000 | Baghdasarian |
| 6,017,002 | A | 1/2000 | Burke |
| 6,081,234 | A | 6/2000 | Huang |
| 6,217,975 | B1 | 4/2001 | Daton-Lovett |
| 6,225,965 | B1 | 5/2001 | Gilger et al. |
| 6,384,787 | B1 | 5/2002 | Kim |
| 6,581,883 | B2 | 6/2003 | McGee |
| 6,970,143 | B2 | 11/2005 | Allen |
| 6,983,914 | B2 | 1/2006 | Stribling |
| 7,030,824 | B1 | 4/2006 | Taft |
| 7,602,349 | B2 | 10/2009 | Hentosh |
| 8,289,221 | B1 | 10/2012 | Finucane |
| 8,356,774 | B1 * | 1/2013 | Banik ............... B64G 1/222 244/171.1 |
| 8,365,774 | B2 * | 2/2013 | Kamata ............... B05D 7/02 264/36.16 |
| 8,683,755 | B1 * | 4/2014 | Spence ............... B64G 1/222 52/173.3 |
| 8,720,830 | B1 | 5/2014 | Szatkowski |
| 8,757,554 | B1 | 6/2014 | Harvey |
| 8,814,099 | B1 | 8/2014 | Harvey |
| 8,816,187 | B1 | 8/2014 | Stribling |
| 8,894,017 | B1 | 11/2014 | Baghdasarian |
| 8,905,357 | B1 | 12/2014 | Harvey |
| 9,214,892 | B2 | 12/2015 | White |
| 9,270,021 | B1 | 2/2016 | Harvey |
| 9,528,264 | B2 | 12/2016 | Freebury |
| 9,550,584 | B1 | 1/2017 | Harvey |
| 9,593,485 | B2 | 3/2017 | Freebury |
| 9,605,430 | B2 * | 3/2017 | Baudasse ............ E04C 3/005 |
| 9,608,333 | B1 | 3/2017 | Toledo et al. |
| 9,731,844 | B2 * | 8/2017 | Allen ............... B64G 1/64 |
| 9,840,060 | B2 | 12/2017 | Francis |
| 10,059,471 | B2 * | 8/2018 | Steele ............... B64G 1/443 |
| 10,119,292 | B1 | 11/2018 | Harvey et al. |
| 10,170,843 | B2 | 1/2019 | Thomson |
| 10,211,535 | B2 | 2/2019 | Rahmat-Samii |
| 10,256,530 | B2 | 4/2019 | Freebury |
| 10,263,316 | B2 * | 4/2019 | Harvey ............... H01Q 15/20 |
| 10,276,926 | B2 | 4/2019 | Cwik |
| 10,283,835 | B2 | 5/2019 | Harvey |
| 10,370,126 | B1 | 8/2019 | Harvey |
| 10,418,721 | B2 | 9/2019 | Chattopadhyay |
| 2007/0262204 | A1 | 11/2007 | Beidleman |
| 2008/0283670 | A1 | 11/2008 | Harvey |
| 2010/0163684 | A1 * | 7/2010 | Dando ............... B64G 1/222 244/172.6 |
| 2010/0263709 | A1 | 10/2010 | Norman et al. |
| 2012/0167943 | A1 | 7/2012 | Blanchard et al. |
| 2012/0235874 | A1 | 9/2012 | Kwak |
| 2016/0024790 | A1 | 1/2016 | Baudasse et al. |
| 2016/0197394 | A1 | 7/2016 | Harvey et al. |
| 2017/0021947 | A1 * | 1/2017 | Pellegrino ............ H02S 10/40 |
| 2017/0093046 | A1 | 3/2017 | Harvey et al. |
| 2017/0110803 | A1 | 4/2017 | Hodges |
| 2017/0222308 | A1 | 8/2017 | Freebury et al. |
| 2018/0128419 | A1 | 5/2018 | Brown |
| 2018/0203225 | A1 | 7/2018 | Freebury |
| 2018/0244405 | A1 | 8/2018 | Brown |
| 2018/0297724 | A1 | 10/2018 | Harvey |
| 2019/0027835 | A1 | 1/2019 | Hoyt |
| 2019/0063892 | A1 | 2/2019 | Brown |
| 2019/0237859 | A1 | 8/2019 | Freebury |

FOREIGN PATENT DOCUMENTS

| | | |
|---|---|---|
| EP | 3059800 B1 | 8/2017 |
| WO | 2018005532 A1 | 1/2018 |
| WO | 2018191427 A1 | 10/2018 |
| WO | 2019171062 A1 | 12/2019 |

OTHER PUBLICATIONS

International Preliminary Examining Authority, United States Patent and Trademark Office, International Preliminary Report on Patentability, Application No. PCT/US2020/014435, dated Jul. 29, 2021, 10 pages.
"Extended Search Report Issued in European Patent Application No. 20742042.3", dated Sep. 5, 2022, 3 Pages.
"Office Action and Search Report Issued in Canada Patent Application No. 3,122,445", dated Jul. 26, 2022, 3 Pages.
De Boer, GaAs Mixed Signal Multi-Function X-Band Mmic with 7 Bit Phase and Amplitude Control and Integrated Serial to Parallel Converter, TNO Physics and Electronics Laboratory.
Grafmuller, et al, "The TerraSAR-X Antenna System", 2005 IEEE.
Gatti et al, Computation of Gain, Noise Figure, and Third-Order Intercept of Active Array Antennas. IEEE Transactions on Antennas and Propagation, vol. 52, No. 11, Nov. 2004.
Moreira, TerraSAR-X Upgrade to a Fully Polarimetric Imaging Mode. German Aerospace Center (DLR), Jan. 16, 2003.
Smith et al., Coplanar Waveguide Feed for Microstrip Patch Antennas. Electronics Letters, vol. 28, No. 25. Dec. 3, 1992.
Gatti et al., A Novel Phase-Only Method for Shaped Beam Synthesis and Adaptive Nulling. University of Perugia, Dept. Electronic and Information Engineering.
Mencagli et al., Design of Large MM-Wave Beam-Scanning Reflectarrays. University of Perugia, Dept. Electronic and Information Engineering.
Sorrentino et al., Beam Steering Reflectarrays. University of Perugia.
Kim et al., Spaceborne SAR Antennas for Earth Science.
Marcaccioli et al., Beam Steering MEMS mm-Wave Reflectarrays. University of Perugia, Dept. of Information and Electronic Engineering.
Sorrentino et al., Electronic Reconfigurable MEMS Antennas. University of Perugia, Dept. of Electronic and Information Engineering.
Bachmann et al., TerraSAR-X In-Orbit Antenna Model Verification Results. German Aerospace Center (DLR).
Bialkowski et al., Bandwidth Considerations for a Microstrip Reflectarray. Progress in Electromagnetics Research B, vol. 3, 173-187, 2008.
Mikulas et al., Tension Aligned Deployable Structures for Large 1-D and 2-D Array Applications. 49th AIAA/ASME/ASCE/AHS/ASC Structures, Structural Dynamics and Materials Conference, Apr. 7-10, 2008.
Freeman et al., On the Use of Small Antennas for SAR and SAR Scatterometer Systems.
Gatti et al., Scattering Matrix Approach to the Design of Infinite Planar Reflectarray Antennas. DIEI, University of Perugia.
Ebadi et al., Linear Reflectarray Antenna Design Using 1-bit Digital Phase Shifters. D.I.E.I. University of Perugia.
Ebadi et al., Near Field Focusing in Large Reflectarray Antennas Using 1-bit Digital Phase Shifters. DIEI, University of Perugia.
Sorrentino et al., Recent Advances on Millimetre Wave Reconfigurable Reflectarrays. DIEI, University of Perugia.
Chen et al., Fully Printed Phased-Array Antenna for Space Communications.
Gatti et al., Millimetre Wave Reconfigurable Reflectarrays. RF Microtech, a spin-off of the University of Perugia, c/o DIEI.

(56) References Cited

OTHER PUBLICATIONS

Montori et al., Constant-Phase Dual Polarization MEMS-Based Elementary Cell for Electronic Steerable Reflectarrays. University of Perugia, Dept. of Electronic and Information Engineering.

Marcaccioli et al., RF MEMS-Reconfigurable Architectures for Very Large Reflectarray Antennas. Dept. of Electronic and Information Engineering, University of Perugia.

Carrasco et al., Dual-polarization reflectarray elements for Ku-band Tx/Rx portable terminal antenna. RF Microtech.

Mencagli et al., Design and Realization of a MEMS Tuneable Reflectarray for mm-wave Imaging Application. University of Perugia, DIEI.

Younis, et al, A Concept for a High Performance Reflector-Based X-Band SAR. German Aerospace Center (DLR), Microwaves and Radar Institute.

Montori et al., Design and Measurements of a 1-bit Reconfigurable Elementary Cell for Large Electronic Steerable Reflectarrays. Dept. of Electronic and Information Engineering.

Montori et al., 1-bit RF-MEMS-Reconfigurable Elementary Cell for Very Large Reflectarray. Dept. of Electronic and Information Engineering.

Moussessian et al., An Active Membrane Phased Array Radar. Jet Propulsion Laboratory, California Institute of Technology.

Fisher, Phased Array Feeds for Low Noise Reflector Antennas. Electronics Division Internal Report No. 307, Sep. 24, 1996.

Montori et al., Wideband Dual-Polarization Reconfigurable Elementary Cell for Electronic Steerable Reflectarray at Ku-Band. University of Perugia, Dept. of Electronic and Information Engineering.

Gannudi et al., Preliminary Design of Foldable Reconfigurable Reflectarray for Ku-Band Satellit4e Communication. University of Perugia, Dept. of Electronic and Information Engineering.

Tienda, et al., Dual-Reflectarray Antenna for Bidirectional Satellite Links in Ku-Band. European Conference on Antennas and Propagation, Apr. 11-15, 2011.

Lane et al., Overview of the Innovative Space-Based Radar Antenna Technology Program. Journal of Spacecraft and Rockets. vol. 48, No. 1 Jan.-Feb. 2011.

Devireddy et al., Gain and Bandwidth Limitations of Reflectarrays. Dept. of Eletrical Engineering. ACES Journal, vol. 26, No. 2. Feb. 2011.

Knapp et al., Phase-Tilt Radar Antenna Array. Dept. of Electrical and Computer Engineering, University of Massachusetts.

Moussessian et al., Large Aperture, Scanning, L-Band SAR (Membrane-based Phased Array). 2011 Earth Science Technology Forum.

Arista et al., Reskue Project: Transportable Reflectarray Antenna for Satellite Ku-Band Emergency Communications.

DuPont Kapton, Polyimide Film. General Specifications.

Footdale et al., Static Shape and Modal Testing of a Deployable Tensioned Phased Array Antenna. 53rd AIAA/ASME/ASCE/AHS/ASC Structures, Structural Dynamics and Materials Conference. Apr. 23-26, 2012.

Montori et al., Reconfigurable and Dual-Polarization Folded Reflectarray Antenna. Dept. of Electronic and Information Engineering. University of Perugia.

Zebrowski, Illumination and Spillover Efficiency Calculations for Rectangular Reflectarray Antennas. High Frequency Electronics.

Jeon et al., Structural Determinancy and Design Implications for Tensioned Precision Deployable Structures. 54th AIAA/ASME/ASCE/AHS/ASC Structures, Structural Dynamics, and Materials Conference. Apr. 8-11, 2013.

Bachmann et al., TerraSAR-X Antenna Calibration and Monitoring Based on a Precise Antenna Model.

Hum et al., Reconfigurable Reflectarrays and Array Lenses for Dynamic Antenna Beam Control: A Review. IEEE Transactions on Antennas and Propagation. Aug. 21, 2013.

Hodges et al., ISARA Integrated Solar Array Reflectarray Mission Overview. Jet Propulsion Laboratory. California Institute of Technology. Aug. 10, 2013.

Cooley, Michael "Phased Array-Fed Reflector (PAFR) Antenna Architectures for Space-Based Sensors." Northtrop Grumman Electronic Systems. 2015.

FedBizOpps, Cubesat Solar Sail Systems—ManTech/Nexolve. Oct. 25, 2013.

Metzler, Thomas "Design and Analysis of a Microstrip Reflectarray". University of Massachusetts. 1993.

Synak, Aleksander "Erasmus Student Exchange Project: Design and Implementation of UHF Patch Antenna." Universitat Politecnica De Catalunya.

Cassini Program Environmental Impact Statement Supporting Study, vol. 2: Alternate Mission and Power Study. Jet Propulsion Laboratory, California Institute of Technology, Jul. 1994.

Military Specification. Assemblies, Moving Mechanical, for Space and Launch Vehicles, General Specification for. Apr. 18, 1988.

Dearborn, Michael et al., A Deployable Membrane Telescope Payload for CubeSats. JoSS, vol. 3, No. 1, pp. 253-264.

Engberg, Brian et al., A High Stiffness Boom to Increase the Moment-ARM for a Propulsive Attitude Control System on FalconSat-3. 17th Annual AIAA/USU Conference on Small Satellites. 2003.

Arya, Manan, Wrapping Thick Membranes with Slipping Folds. California Institute of Technology. American Institute of Aeronautics and Astronautics. 2015.

Guest, S.D., et al., Inextensional Wrapping of Flat Membranes. Department of Engineering, University of Cambridge. 1992.

Luo, Qi, et al., Design and Analysis of a Reflectarray Using Slot Antenna Elements for Ka-band SatCom. IEEE Transactions on Antennas and Propagation, vol. 63, No. 4. Apr. 2015.

Leipold, M. et al., Large SAR Membrane Antennas with Lightweight Deployable Booms. 28th ESA Antenna Workshop on Space Antenna Systems and Technologies, ESA/ESTEC, May 31-Jun. 3, 2005.

Fang, Houfei, et al., In-Space Deployable Reflectarray Antenna: Current and Future. American Institute of Aeronautics and Astronautics. 2008.

Rauschenbach, H.S. et al., Solar Cell Array Design Handbook. vol. 1. Jet Propulsion Laboratory. California Institute of Technology. Oct. 1976.

Triolo, Jack, Thermal Coatings Seminar Series Training. Part 1: Properties of Thermal Coatings. NASA GSFC Contamination and Coatings Branch—Code 546. Aug. 6, 2015.

Huang, John, et al., A 1-m X-band Inflatable Reflectarray Antenna. Jet Propulsion Laboratory. California Institute of Technology. Jun. 24, 1998.

Belvin, W., et al., Advanced Deployable Structural Systems for Small Satellites. Sep. 2016.

Cesar-Auguste, Virginie, et al., An Investigation of Germanium Coated Black Kapton and Upilex Films Under Different Environmental Ground Conditions. 2009.

Pacette, Paul E. et al., A Novel Reflector/Reflectarry Antenna. An Enabling Technology for NASA's Dual-Frequency ACE Radar. Jun. 14, 2012.

Liu, ZhiQuan, et al., Review of Large Spacecraft Deployable Membrane Antenna Structures. Feb. 28, 2017.

Sheldahl A Multek Brand, The Red Book. 2019.

EoPortal Directory, FalconSat-7. Satellite Missions. https://directory.eoportal.org/web/eoportal/satellite-missions/f/falconsat-7. 2020.

Finckenor, Miria et al., Results of International Space Station Vehicle Materials Exposed on MISSE-7B. Jun. 27, 2012.

Kurland, Richard et al., Current Results From the Advanced Photovoltaic Solar Array (APSA) Program. Aug. 9, 1993.

Bron Aerotech, Aerospace Material to Spec. 2020.

Straubel, Marco, Design and Sizing Method for Deployable Space Antennas, Dissertation. Jul. 2, 2012.

Biddy, Chris et al., LightSail-1 Solar Sail Design and Qualification. 41st Aerospace Mechanisms Symposium, Jet Propulsion Laboratory, May 16-18, 2012.

Murphey, Thomas W. et al., Tensioned Precision Structures. Air Force Research Laboratory. Jul. 24, 2013.

Kiziah, Rex, et al., Air Force Academy Department of Physics Space Technologies Development and Research. 30th Space Symposium, Technical Track, May 21, 2014.

(56) References Cited

OTHER PUBLICATIONS

Smith, Brian FalconSAT-7 Deployable Solar Telescope. United States Air Force Academy. Space Physics and Atmospheric Research Center. Aug. 5, 2014.
Dearborn, Michael et al., A Deployable Membrane Telescope Payload for CubeSats. JoSS, vol. 3, No. 1, pp. 253-264. 2014.
Sheldahl A Multek Brand, Product Bulletin. Germanium Coated Polyimide. 2020.
P. Keith Kelly, A Scalable Deployable High Gain Antenna-DaHGR. 30th Annual AIAA/USU Conference on Small Satellites. 2016.
P. Keith Kelly, A Scalable Deployable High Gain Antenna-DaHGR. Powerpoint. 2016.
Mooney, C. et al., STAMET—A Materials Investigation. CNES. 2020.
Su Xiaofeng, et al., Wrinkling Analysis of a Kapton Square Membrane under Tensile Loading. 44th AIAA/ASME/ASCE/AHS Structures, Structural Dynamics, and Materials Conference. Apr. 7-10, 2003.
Huang, John et al., Reflectarry Antennas. IEEE Press. 2008.
European Search Report for European Patent Appl. No. 16155768. 1, dated Jul. 15, 2016.
Focatiis et al ., Deployable Membranes Designed from Folding Tree Leaves , Philosophical Transactions of the Royal Society of London A , 2002 , pp. 1-12 , The Royal Society.
Guest et al ., Inextensional Wrapping of Flat Membranes , Proceedings of the First International Seminar on Structural Morphology ,Sep. 7-11, 1992 , pp. 203-215.
Im et al ., Prospects of Large Deployable Reflector Antennas for a New Generation of Geostationary Doppler Weather Radar Satellites , AIAA Space 2007 Conference & Exposition , Sep. 18-20, 2007 , pp . 1-11 , American Institute of Aeronautics and Astronautics ,Inc.
Mallikarachchi , Thin—Walled Composite Deployable Booms withTape—Spring Hinges , May 2011 , pp. 1-181 , University of Cambridge.
Thomson , Mechanical vs . Inflatable Deployable Structures for Large Apertures or Still No Simple Answers , Nov. 10-11, 2008 , pp. 1-24 , Keck Institute for Space Sciences.
Huang et al ., Reflectarray Antennas , Oct. 2007 , pp. ii-xii , 1-7 , 9-26 , 112-118 , 137-143 , 182-193 and 201 205.
Arya, Wrapping Thick Membranes with Slipping Folds, American Institute of Aeronautics and Astronautics, California Institute of Technology.
Biddy et al., LightSail-1 Solar Sail Design and Qualification, May 2012, pp. 451-463, Proceedings of the 41st Aerospace Mechanisms Symposium, Jet Propulsion Laboratory.
John Wiley & Sons , Inc .CubeSat Design Specification Rev 13 , Feb. 20, 2014 , pp. 1-42 ,California Polytechnic State University.
Cesar-Auguste et al., An Investigation of Germanium Coated Black Kapton and Upilex Films under Different Environmental Ground Conditions, ESA-ESTEC, Materials Technology Section, The Netherlands.
Dearborn et al., A Deployable Membrane Telescope Payload for CubeSats, JoSS, vol. 3, No. 1., pp. 253-264.
Demaine, Geometric Folding Algorithms: Linkages, Origami, Polyhedra, Fall 2010.
Demaine et al., Geometric Folding Algorithms, Feb. 2007.
Fang, et al., In-Space Deployable Reflectarray Antenna: Current and Future, American Institute of Aeronautics and Astronautics.
Kelly, A Scalable Deployable High Gain Antenna-DaHGR, 30th Annual AIAA/USU, Conference on Small Satellites.
Kiziah et al., Air Force Academy Department of Physics Space Technologies Development and Research, May 2014, 30th Space Symposium.
Leipold et al., Large SAR Membrane Antennas with Lightweight Deployable Booms, Jun. 2005, 28th ESA Antenna Workshop on Space Antenna Systems and Technologies.
Shaker et al., Reflectarray Antennas Analysis, Design, Fabrication, and Measurement, Book, 2014, Artech House.
Stella et al., Current Results From the Advanced Photovoltaic Solar Array (APSA) Program.
Straubel, Design and Sizing Method for Deployable Space Antennas, Dissertation, Jul. 2012.
Su et al., Wrinkling Analysis of a Kapton Square Membrane under Tensile Loading, Apr. 2003.
Triolo, NASA Technical Reports Server (NTRS) 20150017719: Thermal Coatings Seminar Series Training Part 2: Environmental Effects, Aug. 2015.
Huang, The Development of Inflatable Array Antennas, Jet Propulsion Laboratory, California Institute of Technology.
Huang et al., Inflatable Microstrip Reflectarray Antennas at X and Ka-band Frequencies, Jul. 1999.
Huang et al., A One-Meter X-Band Inflatable Reflectarray Antenna, Jet Propulsion Laboratory, California Institute of Technology.
Integrated Solar Array and Reflectarray Antenna (ISARA), National Aeronautics and Space Admnistration (NASA), May 3, 2013.
MacGillivray, Charles, "Miniature Deployable High Gain Antenna for CubeSats", Apr. 2011.
Military Specification (MIL)-A-83577B (USAF), Assemblies, Moving Mechanical, for Space and Launch Vehicles, General Specification for (DOD, Mar. 15, 1978).
TRW Engineering & Test Division, (1990) Advanced Photovoltaic Solar Array Prototype . Fabrication, Phase IIB, JPL Contract No. 957990 (Mod 6), TRW Report No. 51760-6003-UT-00.
"Capella Space closes $19M Series B to deliver reliable Earth Observation data on demand", Capella Space, Sep. 26, 2018.
"Capella Space", GlobalSecurity.org, https://www.globalsecurity.org/space/systems/capella.htm.
Fernholz, Tim, "Silicon Valley is investing $19 million in space radar", Quartz, Sep. 29, 2018.
Werner, Debra "Capella's First Satellite launching this fall", Spacenews, Aug. 8, 2018.
Capella Space is First American Company to Send Advanced Commercial Radar Satellite to Space', Markets Insider, Dec. 3, 2018.
"Capella X-SAR (Synthetic Aperture Radar) Constellation", eoPortal Directory.
Banazedehm, Payam "Prepare to Launch [Entire Talk]", Stanford eCorner, Aug. 5, 2019.
Kamra, Deepak "Capella Space—Getting the Full Picture", Canaan, Jan. 7, 2017.
"Capella Space Corporation—Testing the First Commercial U.S. SAR Satellite".
Werner, Debra "Capella Space gets ready for primetime as constellation operator", Spacenews, Jun. 3, 2019.
Capella Space "The Capella 36".
MMA Design LLC "Another MMA HaWk Takes Flight" https://mmadesignllc.com/2019/05/sparc-1-hawks-take-flight/.
MMA Design LLC "FalconSAT-7 Finally Earns its Wings!" https://mmadesign.com/2019/07/falconsat-7-finally-earns-its-wings/.
MMA Design LLC "Customize Your HaWK" https://mmadesignllc.com/customize-your-hawk/.
MMA Design LLC "Asteria's HaWK solar arrays successfully deploy in space!" https://mmadesignllc.com/2018/01/asteria-hawk-deploys-in-space/.
MMA Design LLC "MarCO HaWKs Headed to Mars!" https://mmadesignllc.com/2018/05/marco-mission-hawks-poised-for-launch-2/.
MMA Design LLC "JPL's ASTERIA wins SmallSat Mission of the Year!" https.
MMA Design LLC "MarCO Mission HaWKs poised for launch!" https://mmadesignllc.com/2018/04/marco-mission-hawks-poised-for-launch/.
MMA Design LLC "MarCO Mission's twin CubeSats rule the headlines" https://mmadesignllc.com/2018/11/marco-rules-the-headlines/.
MMA Design LLC "MMA Solar Arrays Launch on ASTERIA CubeSat!" https://mmadesignllc.com/2017/08/asteria-launch/.
MMA Design LLC "eHaWK 27A-84FV".
MMA Design LLC "eHaWK 27AS112".
MMA Design LLC "HaWK 17A-42".
MMA Design LLC "HaWK 17AB36".
MMA Design LLC "HaWK 17AS42".
MMA Design "HaWK 17AS56".

(56) References Cited

OTHER PUBLICATIONS

MMA Design LLC "T-DaHGR X-Band Antenna for CubeSats—1-meter diametere aperture deployed from 1U", 2019 CubeSat Workshop, Apr. 2019.
MMA Design LLC "Our Missions" https://mmadesignllc.com/about/missions/.
MMA Design LLC "P-DaHGR Antenna" https://mmadesignllc.com/product/p-dahgr-antenna/.
MMA Design LLC "R-DaHGR" https://mmadesignllc.com/product/large-aperture-rigid-array-lara/.
MMA Design LLC "Research Grant Awards" https://mmadesignllc.com/about/research-grant-awards/.
MMA Design LLC "rHaWK Solar Array" https://mmadesignllc.com/product/r-hawk-solar-array/.
MMA Design LLC T-DaHGR Antenna https://mmadesignllc.com/product/t-dahgr-antenna/.
Sheldahl, Product Bulletin, Novaclad G2 300.
Gatti et al., Low Cost Active Scanning Antenna for Mobile Satellite Terminals, University of Perugia, Dept. Electronic and Information Engineering.
Fang Huang, Analysis and Design of Coplanar Waveguide-Fed Slot Antenna Array, IEEE Transactions on Antennas and Propagation, vol. 47, No. 10, Oct. 1999.
MasterSil 155 Mastere Bond Polymer System, MasterSil 155 Technical Data Sheet.
Eccosorb HR Lightweight, Open-cell, Broadband Microwave Absorber, Laird.
Single Wires ESCC 3901018, Axon Cable & interconnect.
ESCC Cables & harnesses made by AXON, Axon Cable & interconnect.
Rahmat-Samii, Ka Band Highly Constrained Deployable Antenna for RaInCube.
Murphy, Tyler et al., PEZ: Expanding CubeSat Capabilities through Innovative Mechanism Design, 25th Annual AIAA/USU Conference on Small Satellites.
Khayatian, Behrouz et al. "Radiation Characteristics of Reflectarray Antennas: Methodology and Applicatios to Dual Configurations", Jet Propulsion Laboratory.
Fang, Houfei Thermal Distortion Analyses of a Three-Meter Inflatable Reflectarray Antenna, Jet Propulsion Laboratory.
Jones, P. Alan, et al. "Spacecraft Solar Array Technology Trends", AEC-Able Engineering Company, Inc.
Jamaluddin, M.H. et al., "Design, Fabrication and Characterization of a Dielectric Resonator Antenna Reflectarray in Ka-Band", Progress In Electromagnetics Research B, vol. 25, 261-275, 2010.
Mierheim, Olaf, et al. "The Tape Spring Hinge Deployment System of the EU: Cropis Solar Panels", German Aerospace Center DLR.
Ferris et al, The Use, Evolution and Lessons Learnt of Deployable Static Solar Array Mechanisms. Proceedings of the 42nd Aerospace Mechanisms Symposium, NASA Goddard Space Flight Center, May 14-16, 2014.
"DARPA prototype reflectarray antenna offers high performance in small package", PHYSORG, Jan. 23, 2019.
Lele et al., Reflectarray Antennas, International Journal of Computer Applications, vol. 108, No. 3, Dec. 2014.
Cadogan et al., The Development of Inflatable Space Radar Reflectarrays, 40th AIAA/ASME/ASCE/AHS/ASC Structures, Structural Dynamics, and Materials (SDM) Conference, Apr. 12-15, 1999.
Klesh et al., MarCO: CubeSats to Mars in 2016, Jet Propulsion Laboratory, 29th Annual AIAA/USU Conference on Small Satellites.
Huang, John, Capabilities of Print cd Reflectarray Antennas, Jet Propulsion Laboratory, California Institute of Technology.
Huang, John, Review and Design of Printed Reflectarray Antennas, Jet Propulsion Laboratory, California Institute of Technology.
Zawadzki, Mark et al., Integrated RF Antenna and Solar Array for Spacecraft Application, Jet Propulsion Laboratory, California Institute of Technology.

Hand, Thomas, et al., Dual-Band Shared Aperture Reflector/Reflectarray Antenna Designs, Technologies and Demonstrations for NASA's ACE Radar.
Pacheco, Pedro et al., A Non-Explosive Release Device for Aerospace Applications Using Shape Memory Alloys.
Greco, Francesco et al., A Ka-Band Cylindrical Paneled Reflectarray Antenna, Jun. 10, 2019.
Carrasco, Eduardo et al., Reflectarray antennas: A review, Foundation for Research on Information Technologies in Society (IT'IS).
Zuckermandel, J. et al., Design, Build, and Testing of TacSat Thin Film Solar Arrays, MicroSat Systems, Inc., 20th Annual AIAA/USU Conference on Small Satellites.
Filippazzo, Giancarlo et al., The Potential Impact of Small Satellite Radar Constellations on Traditional Space Systems, 5th Federated and Fractionated Satellite Systems Workshop, Nov. 2-3, 2017.
Warren et al., Large, Deployable S-Band Antenna for a 6U Cubesat. 29th Annual AIAA/USU Conference on Small Satellites.
Sauder et al., Ultra-Compact Ka-Band Parabolic Deployable Antenna for RADAR and Interplanetary CubeSats. 29th Annual AIAA/USU Conference on Small Satellites.
Kelly, A Scalable Deployable High Gain Reflectarray Antenna-DaHGR. MMA Design LLC.
Montori et al., A Transportable Reflectarray Antenna for Sateltite Ku-Band Emergency Communications. IEEE Transactions on Antennas and Propagation. vol. 63, No. 4, Apr. 2015.
Larranaga et al., On the Added Value of Quad-Pol Data in a Multi-Temporal Crop Classification Framework Based on RADARSAT-2 Imagery. Remote Sens. 2016, 8, 335.
Petkov et al., Charge Dissipation in Germanium-Coated Kapton Films at Cryogenic Temperatures. Jet Propulsion Laboratory. California Institute of Technology.
Sheldahl, Product Bulletin, Germanium Coated Polyimide.
Medina-Sanchez, Rafael "Beam Steering Control System for Low-Cost Phased Array Weather Radars: Design and Calibration Techniques". Doctoral Dissertations. University of Massachusetts. May 2014.
Eom et al., A Cylindrical Shaped-Reflector Antenna with a Linear Feed Array for Shaping Complex Beam Patterns. Progress in Electromagnetics Research. vol. 119, 477-495, 2011.
Lenz et al., Highly Integrated X-band Microwave Modules for the TerraSAR-X Calibrator.
Kumar et al., Design of a Wideband Reduced Size Microstrip Antenna in VHF/Lower UHF Range.
Giauffret et al., Backing of Microstrip Patch Antennas Fed by Coplanar Waveguides. 26th EuMC, Sep. 9-12, 1996.
Salazar et al., Phase-Tilt Array Antenna Design for Dense Distributed Radar Networks for Weather Sensing. IGARRS 2008.
Gatti et al., Slotted Waveguide Antennas with Arbitrary Radiation Pattern. University of Perugia.
Huber et al., Spaceborne Reflector SAR Systems with Digital Beamforming. IEE Transactions on Aerospace and Electronic Systems. vol. 48, No. 4. Oct. 2012.
Mejia-Ariza et al., "Ultra-Flexible Advanced Stiffness Truss (U-FAST)" AIAA SciTech Fourm. Jan. 4-8, 2016.
Rogers Corporation, Copper Foils for High Frequency Materials.
Younis et al., Performance Comparision of Reflector- and Planar-Ant4enna Based Digital Beam-Forming SAR. International Journal of Antennas and Propagation. vol. 2009.
Montori et al., Novel 1-bit Elementary Cell for Reconfigurable Reflectarray Antennas. Dept. of Electronic and Information Engineering. University of Perugia.
Gatti, Roberto "Pubblicazioni Reflectarrays".
Montori et al., W-band beam-steerable MEMS-based reflectarray. International Journal of Microwave and Wireless Technologies. Jul. 15, 2011.
Pehrson et al., Folding Approaches for Tensioned Precision Planar Shell Structures. AIAA SciTech Fourm. 2018 AIAA Spacecraft Structures Conference. Jan. 8-12, 2018.
Greschik et al., Error Control via Tension for an Array of Flexible Square Antenna Panels. 51st AIAA/ASME/ASCE/AHS/ASC Structures, Structural Dynamics, and Materials Conference. Apr. 12-16, 2010.

(56) References Cited

OTHER PUBLICATIONS

Greschik et al., Strip Antenna Figure Errors Due to Support Truss Member Length Imperfections. 45th AIAA/ASME/ASCE/AHS/ASC Structures, Structural Dynamics and Materials Conference. Apr. 19-22, 2004.

DuPont Kapton 200EN Polyimide Film, 50 Micron Thickness. http://www.matweb.com/search/datasheet_print.aspx?matguid=305905ff1ded40fdaa34a18d8727a4dc.

* cited by examiner

DEPLOYABLE SYSTEM WITH FLEXIBLE MEMBRANE

CROSS-REFERENCE TO RELATED APPLICATIONS

The present application claims benefit of priority to U.S. Provisional Application No. 62/794,385, entitled "Deployable System with Flexible Membrane" and filed on Jan. 18, 2019, which is specifically incorporated by reference herein for all that it discloses and teaches.

BACKGROUND

One approach to providing a deployable system that can support a device or devices so as to realize a large aperture is to provide a number of rigid, planar panels deployed along a single axis. Each rigid panel supports a device, a portion of a device, or multiple devices. Typically, the devices are solar cells and/or radiofrequency antennas. However, other types of devices are also feasible. In the undeployed state, the rigid panels and supported devices are stored as a stack of panels. When deployed, the rigid panels unstack along a single axis so as to form a substantially rigid, planar structure extended along the axis.

SUMMARY

The described technology relates to a deployable system that is adapted to deploy a flexible membrane or blanket, which can, in turn, support a device or devices so as to realize a large aperture for the device or devices. In some implementations, however, no devices are supported on the flexible membrane.

The described technology provides a system for extraterrestrial deployment of a flexible membrane surface including a flexible membrane having a periphery and an interior. The flexible membrane is rolled about a roll axis into a cylindrical geometric shape in an undeployed state. A payload base has extendable radial booms, wherein the distal end of each extendable radial boom is attached to the periphery of the flexible membrane and the interior of the flexible membrane is free of attachment to the extendable radial booms. The payload base and the extendable radial booms are positioned to one side of the flexible membrane along the roll axis. The extendable radial booms are configured to extend orthogonally to the roll axis from the payload base to unroll the flexible membrane about the roll axis to form the flexible membrane surface in a deployed state, wherein the roll axis is substantially orthogonal to the flexible membrane surface.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
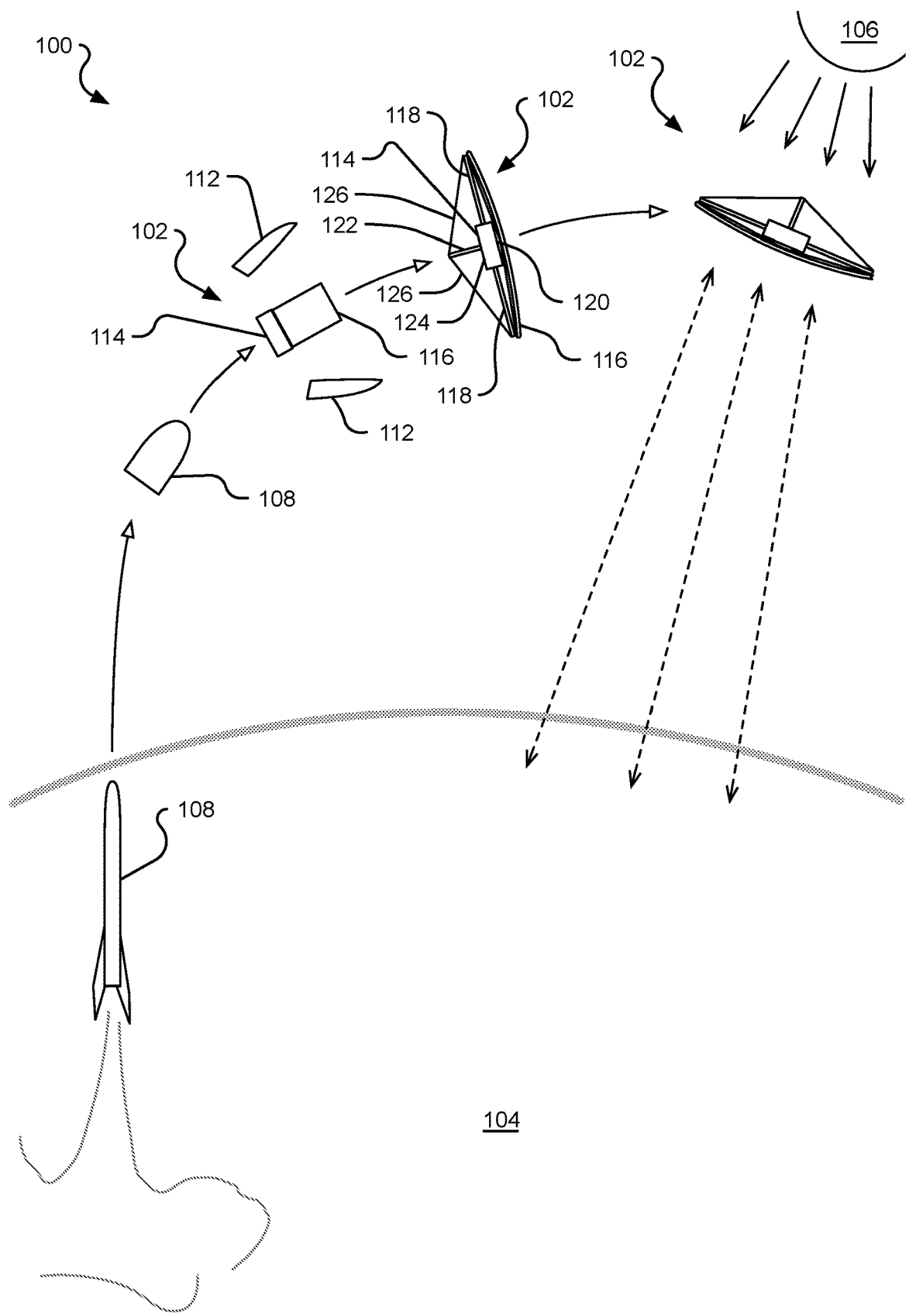
FIG. 1 illustrates an example environment for use in deploying an example deployable system in multiple phases.

The described technology is directed to a deployable system that employs: (a) a flexible membrane to support the device or devices of interest in a deployed state so as to realize a large aperture and (b) a deployment system for transitioning the flexible membrane from an undeployed state to a deployed state. In some implementations, however, no devices are supported on the flexible membrane.

In one embodiment, the flexible membrane has flexibility such that the membrane can be folded/unrolled about at least two orthogonal axes associated with the flexible membrane. These orthogonal axes are referred to as the z-fold axis and the roll axis. Flexibility relative to a z-fold axis allows the flexible membrane to be z-folded so as to define two membrane panels separated by a fold junction. Flexibility relative to the roll axis allows a z-folded membrane to be rolled so as to form a structure having cylindrical geometric shape.

In one implementation, a flexible membrane is formed from multiple semi-rigid panels mounted on a thin continuous flexible substrate fabric that holds the semi-rigid panels together to form a continuous shear-compliant membrane. The thin continuous flexible substrate fabric may be a single piece of fabric, or multiple pieces of fabric bound together to form a single flexible membrane of fabric-supported semi-rigid panels, when in both the undeployed state and the deployed state. In another implementation, the multiple semi-rigid panels themselves are bound together by shear compliant connectors (independent of any thin continuous flexible substrate fabric) to form a continuous shear-compliant membrane of discrete semi-rigid panels. In this implementation, the panels are connected together using the shear compliant connectors at the fold junctions between the panels to a single flexible membrane of junction-connected semi-rigid panels, when in both the undeployed state and the deployed state. In yet another implementation, the devices themselves may be mounted directly on a thin continuous flexible substrate fabric rather than on intermediate semi-rigid panels.

Each panel has a periphery and an interior region within the periphery. For example, in an implementation including the shear compliant connectors, the flexible membrane defines a series of attachment points (e.g., holes) in the interior regions of the semi-rigid panels along the panel edges near where the z-folding occurs. The shear compliant connectors are attached to these attachments points to bind adjacent semi-rigid panels together at a fold junction and to reduce the shearing issue that occurs when a z-folded membrane is subsequently rolled. In this embodiment, the flexible membrane is still deemed to be continuous, although it consists of multiple discrete semi-rigid panels. The interior region is offset from the periphery by at least the distance to accommodate an acceptable shear tolerance between two adjacent panels having the shear compliant connectors attached to positions in the interior regions of the panels. (See, e.g., FIG. 22 for an illustration of shear compliant connectors and acceptable shear tolerances.) As described herein, the term "shear compliant" refers to a flexible yet resilient connection between adjacent panels that allows the adjacent panels to shift relative to each other while entering an undeployed state (e.g., while the panels of the flexible membrane are rolled) and still return to a re-aligned position in a deployed state (e.g., while the panels of the flexible membrane are unrolled).

Example thin continuous flexible substrate fabrics may include without limitation plastic or plastic-like films, woven materials, or other flexible structures or combinations thereof. Panels that can be mounted on such a fabric or otherwise interconnected into a continuous flexible membrane may include plastic or plastic-like films, woven materials, or other flexible structures or combinations thereof.

FIG. 1 illustrates an example environment 100 for use in deploying an example deployable system 102 in multiple phases. The example environment 100 includes the Earth 104 and the Sun 106. In the example environment, a launch vehicle 108 launches from the Earth 104, typically with multiple stages. For example, in one implementation, an engine stage is ignited at launch and burns through a powered ascent until its propellants are exhausted. The engine stage is then extinguished, and a payload stage separates from the engine stage and is ignited. The payload is carried atop the payload stage into orbit.

In FIG. 1, a payload stage 110 has separated from the engine stage (not shown). In the first phase showing the deployable system 102, payload fairings 112, which can form a nose cone to protect a launch vehicle payload against the dynamic pressure and aerodynamic heating during launch through an atmosphere, are jettisoned, exposing the deployable system 102 to the space environment.

As shown in this first (undeployed) phase, the deployable system 102 is shown in an undeployed or stowed state, with a payload base 114 and a flexible membrane 116. The payload base 114 may include without limitation a variety of different sub-systems, such as any combination of navigation sub-systems, propulsion sub-systems, control sub-systems, communication sub-systems, power sub-systems, membrane-deploying sub-systems, and any other payload sub-systems. In this first phase, the flexible membrane 116 of the deployable system 102 is illustrated as stowed in a small-volume undeployed state relative to the deployed state shown in a subsequent phase, typically contained in a launch restraint cage (not shown).

In one implementation, the flexible membrane 116 includes an array or matrix of semi-rigid panels that support a device, a portion of a device, or multiple devices (e.g., photovoltaic devices, radiofrequency devices, optical devices). The semi-rigid panels are rollable, with some amount of resilience, such that the flexible membrane 116 can be rolled about a roll axis. This resilience results in an expansive load on the flexible membrane 116 when in the undeployed (e.g., rolled) state, such that the rolled flexible membrane is biased toward unrolling if not constrained, which presents a utility of the launch restraint cage.

In the next (deployed) phase, the deployable system 102 is shown in a deployed state in which the flexible membrane 116 has been expanded to a larger area relative to the size of the flexible membrane 116 in its undeployed state and the size of the payload base 114. In the illustrated example, (extendable) radial booms 118 extend radially outward from the payload base 114 to unfurl the flexible membrane 116 from its undeployed state. Locations near the periphery region at the perimeter of the expanded form of the flexible membrane 116 are attached to distal ends of the radial booms 118 (e.g., distal ends of the radial booms 118 relative to the payload base 114). Accordingly, as the radial booms 118 extend, the ends of the radial booms 118 push and/or pull to unroll and/or unfold the flexible membrane 116 from its undeployed state to its deployed state. In addition, in at least one implementation, locations within the interior of the flexible membrane 116 are free from attachment to the radial booms 118, so as to facilitate the unrolling and unfolding.

A facing surface 120 of the payload base 114 faces the flexible membrane 116 and is out-of-plane with the radial booms 118. Furthermore, the attachments between the periphery locations of the flexible membrane 116 and the distal ends of the radial booms 118 are short enough to keep the expanded surface of the flexible membrane 116 taut against or otherwise in contact with at least one portion of the facing surface 120 (e.g., the edges of the facing surface 120) or a structural component connected thereto. In this manner, the flexible membrane 116 is tensioned against or otherwise in contact with the payload base 114 (e.g., to reduce or eliminate movement of the flexible membrane 116 during maneuvering). Alternatively, the deployed flexible membrane 116 can be spaced away from the payload base 114, although tensioning the flexible membrane 116 against or otherwise in contact with the payload base 114 can increase the deployed first mode frequency relative to that of a deployed flexible membrane 116 that is spaced away from the payload base 114.

In yet another implementation, one or more points of the interior region of the flexible membrane 116 are anchored to or in contact with the body of the payload base 114 (as opposed to the extendable radial booms of the payload base 114) to provide inward or outward tension or planar stability. For example, in one implementation, the payload base 114 includes a raised surface or structure to provide an outward tensioning against the middle of the flexible membrane 116 to pushing the flexible membrane 116 away from the payload base 114 (e.g., out-of-plane with the periphery of the flexible membrane 116 in a deployed state). In another example, the payload base 114 provides an anchor attached to the middle of the flexible membrane 116, so as to maintain a predetermined separation between the facing surface 120 and the flexible membrane 116 or to pull the interior region of the flexible membrane 116 toward the facing surface 120 (e.g., out-of-plane with the periphery of the flexible membrane 116 in a deployed state).

An (extendable) orthogonal boom 122 extends from the opposite surface 124 of the payload base 114. The orthogonal boom 122 anchors lanyards, tapes, or other connectors that are attached to or near the distal ends of the radial booms 118 to provide additional structural support to those radial booms 118 in the deployed state.

In the next (deployed) phase, the deployable system 102 is maneuvered so that (1) one side of the flexible membrane 116 (which, in this example, supports photovoltaic devices) is directed to receive solar rays efficiently from the Sun 106, and (2) the opposing side of the flexible membrane 116 is directed for radiofrequency communications with terrestrial communications sites on the Earth 104. Typically, the deployable system 102 remains in this orientation while in orbit, although the deployable system 102 may be maneuvered into other orientations as needed. In this configuration, for example, the deployable system 102 can provide a deployed flexible membrane that generates power from a photovoltaic array and provides RF communications from an RF antenna, although other configurations and devices may be employed.

Figure 2A:
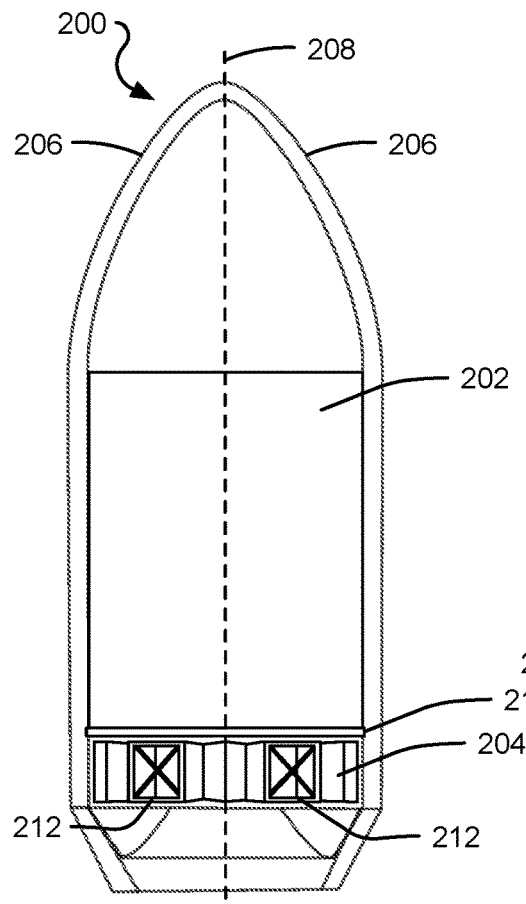
FIGS. 2A-2C illustrate an example deployable system in an undeployed state.
Figure 2B:
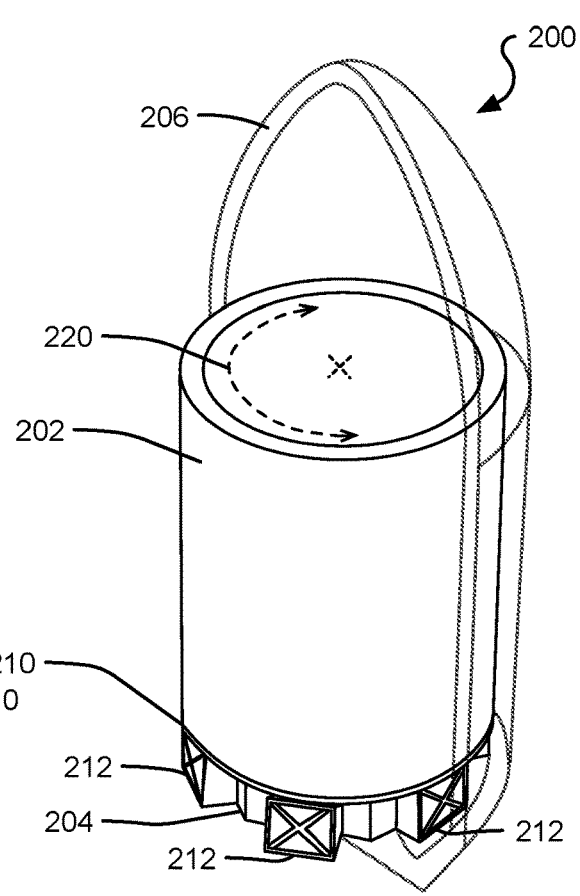
Figure 2C:
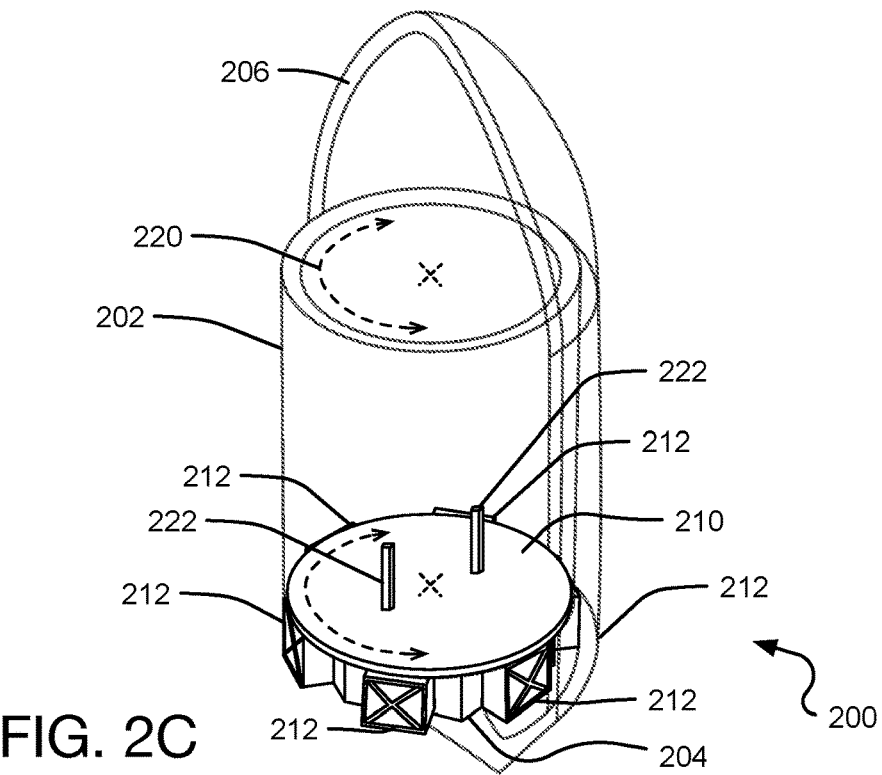

FIGS. 2A-2C illustrate an example deployable system 200 in an undeployed state. The deployable system 200 includes a flexible membrane 202 capable of supporting a device or multiple devices so as to realize a large aperture for the device or devices. Generally, the deployable system 200 includes a payload base 204 and the flexible membrane 202, wherein the payload base 204 includes a deployment system that unfurls the flexible membrane from an undeployed state to a deployed state. In the undeployed state illustrated in FIGS. 2A-2C, the payload base 204 and the flexible membrane 202 are contained within a payload stage of a launch vehicle, as indicated by the payload fairings 206. In some implementations, a launch restraint cage (not shown) is positioned between the flexible membrane 202 and the payload fairings 206 (see, e.g., FIGS. 3A and 3B) and the descriptions thereof for details relating to the launch restraint cage).

FIG. 2A illustrates a partial cross-sectional view from a side of the example deployable system 200 in an undeployed state. The payload fairings 206 are configured to fall away during deployment. When stowed, the flexible membrane 202 is rolled about a roll axis 208 to form a cylindrical geometric shape and positioned atop a rotational platform 210, which is located between the payload base 204 and the flexible membrane 202.

The deployment system of the payload base 204 includes multiple boom ports 212 from which radial booms extend (e.g., in a telescoping format, in a carpenter's tape format, in a one-dimensional extendable boom format) during deployment of the flexible membrane 202. Locations near the perimeter of an expanded form of the flexible membrane 202 are attached to ends of the radial booms (e.g., distal ends of the radial booms relative to the payload base 204). (The attachment elements are not shown in FIGS. 2A-2C.) In one implementation, the attachment elements connect perimeter locations on the flexible membrane 202 (e.g., perimeter with reference to the expanded format of the flexible membrane 202) to or near distal ends of the radial booms (e.g., distal in the sense that the distal end of a radial boom extends away from the payload base 204 during deployment). Accordingly, as the radial booms extend, the ends of the radial booms push and/or pull to unroll and/or unfold the flexible membrane 202 from its undeployed state to its deployed state.

Because the flexible membrane 202 includes one or more semi-rigid panels, the flexible membrane 202 is rolled into the cylindrical geometric shape under an expansive load. Accordingly, in at least one implementation, the rolled flexible membrane is contained within a launch restraint cage (not shown), which is positioned between the payload fairings 206 and the flexible membrane (see, e.g., FIG. 3), in the undeployed state. During deployment, the launch restraint cage is released/opened, and the flexible membrane 202 partially unrolls in response to the expansive load, which is no longer constrained within the launch restraint cage.

FIG. 2B illustrates a partial cut-away perspective view of an example deployable system 200 in an undeployed state. The payload fairings 206 fall away during deployment. The flexible membrane 202 is rolled about a roll axis (which has a position indicated by the dashed line "x" in the center of the roll) to form a cylindrical geometric shape and positioned atop a rotational platform 210, which is positioned between the payload base 204 and the flexible membrane 202. The rolling direction (during stowage) and the unrolling direction (during deployment) are shown by the dashed line arrow 220, although the directions for rolling/unrolling are interchangeable depending upon design constraints.

The deployment system of the payload base 204 includes multiple boom ports 212 from which radial booms extend (e.g., in a one-dimensional format) during deployment of the flexible membrane 202. Locations near the perimeter of an expanded form of the flexible membrane 202 are attached to or near distal ends of the radial booms (e.g., distal ends of the radial booms relative to the payload base 204). (The attachment elements are not shown in FIGS. 2A-2C.) Accordingly, as the radial booms extend radially from the roll axis of the payload base 204, the distal ends of the radial booms push and/or pull to unroll and/or unfold the flexible membrane 202 from its undeployed state to its deployed state.

FIG. 2C illustrates a partial cut-away perspective view of an example deployable system in an undeployed state, revealing the rotational platform 210 between the flexible membrane 202 and the payload base 204. The payload fairings 206 fall away during deployment. The flexible membrane 202 is rolled about a roll axis (which has a position indicated by the dashed line "x" in the center of the roll) to form a cylindrical geometric shape and positioned atop a rotational platform 210, which is positioned between the payload base 204 and the flexible membrane 202. The rolling direction (during stowage) and the unrolling direction (during deployment) are shown by the dashed line arrow 220, although the directions for rolling/unrolling are interchangeable depending upon design constraints.

The deployment system of the payload base 204 includes multiple boom ports 212 from which radial booms extend (e.g., in a one-dimensional extendable boom format, in a telescoping format, in a carpenter's tape format) during deployment of the flexible membrane 202. Locations near the perimeter of an expanded form of the flexible membrane 202 are attached to or near the distal ends of the radial booms (e.g., distal ends of the radial booms relative to the payload base 204). (The attachment elements are not shown in FIGS. 2A-2C but may include lanyards, tapes, and other types of attachment features.) Accordingly, as the radial booms extend radially from the roll axis of the payload base 204, the distal ends of the radial booms push and/or pull to unroll and/or unfold the flexible membrane 202 from its undeployed state to its deployed state.

The flexible membrane 202 is positioned on the rotational platform 210 (e.g., pulled into contact with the rotational platform 210 by a launch retention cage and/or the taut attachments to the distal ends of the radial booms). When the flexible membrane 202 is stowed into an undeployed state, one or more small-radius loops are formed from one or more middle or near-middle portions of the flexible membrane 202, as described with regard to subsequent figures, and the rest of the flexible membrane 202 is rolled about these loops. As such, the one or more small-radius loops are positioned within the interior of the cylindrical geometric shape formed by the rolled flexible membrane, with each small-radius loop having a smaller radius than the interior of the cylindrical geometric shape.

In one implementation, two synchronization pins 222 are positioned on the rotational platform 210, although more or less than two synchronization pins may be employed. In an implementation including a flexible membrane 202 having two small-radius loops, the flexible membrane 202 is installed on the rotational platform 210 such that each synchronization pin is inserted into one of the small-radius loops to releasably anchor the small-radius loops to the rotational platform 210. Rotation of the rotational platform 210 is synchronized with the extension rate of the radial booms so that the flexible membrane 202 unrolls about a roll axis and unfolds along a z-fold axis at controlled rates as the radial booms expand.

In one implementation, the synchronization coordinates the rate at which the rotational platform 210 allows the flexible membrane 202 to unroll about the roll axis with the rate at which the flexible membrane 202 unfolds along the z-fold axis, with both unrolling and unfolding resulting from the outward extension of the radial booms. In one example, the rotational platform 210 allows rotation (and therefore unrolling) primarily during an initial phase of deployment, with that rotation tracking with the rate at which the radial booms are extending the distal ends of the rolled flexible membrane. In this initial phase, the flexible membrane 202 is concurrently unrolling and unfolding. At the end of the initial phase, the flexible membrane 202 is fully unrolled, and the remaining deployment phase is primarily the continued unfolding of the flexible membrane 202 as the radial booms continue to extend. In one implementation, the synchronization pins 222 are released from the small-radius loops (as they disappear when unrolling is completed) and are able to fold down (e.g., on hinges) against the rotational platform 210, out of the way.

FIGS. 3A-3D illustrate an example flexible membrane 300 with respect to a launch restraint cage 302. In one implementation, the launch restraint cage 302 is positioned between the payload fairings (see FIG. 2) and the flexible membrane 300. It should be understood that other launch restraints may be employed to constrain the flexible membrane 300 until the start of a deployment.

Figures 3A, 3B:
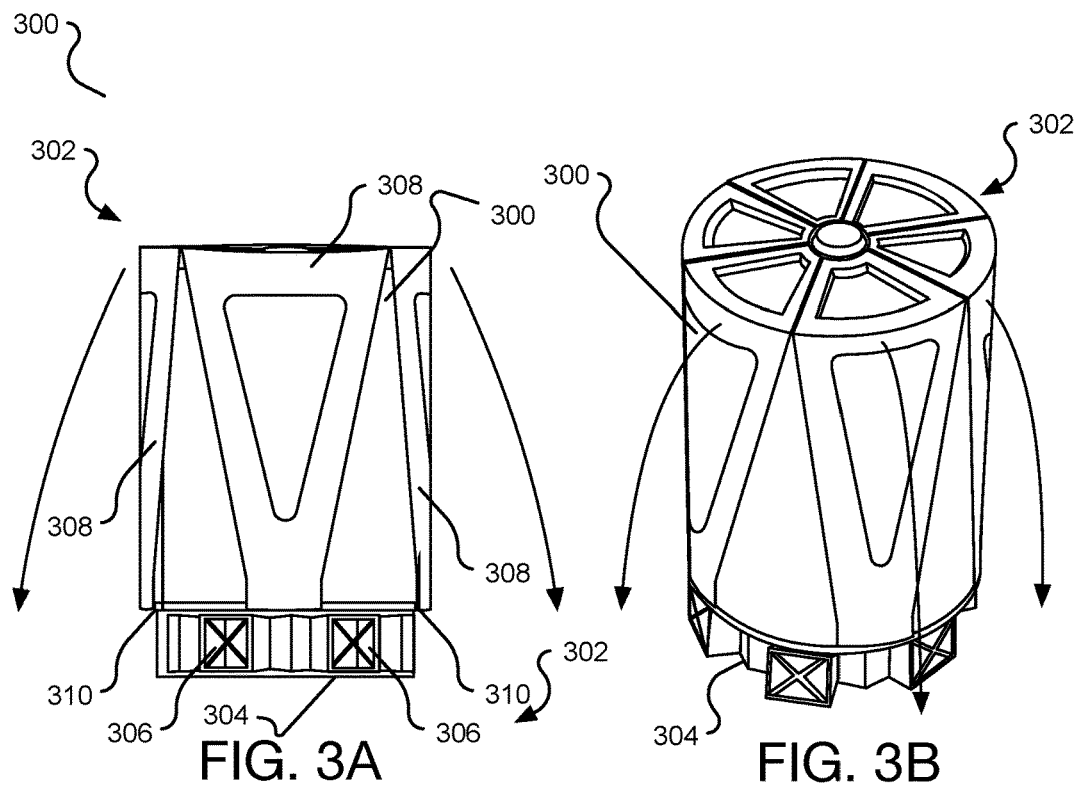
FIGS. 3A-3D illustrate an example flexible membrane with respect to a launch restraint cage.

FIG. 3A illustrates a side view of the flexible membrane 300 in an undeployed state contained within the launch restraint cage 302, which is closed. The flexible membrane 300 is positioned on a payload base 304 from which extendable radial booms can be extended from radial boom ports 306. Restraint arms 308 of the launch restraint cage 302 are shown as closed around the flexible membrane 300. In one implementation, the launch restraint cage 302 constrains the expansive load of the flexible membrane 300 in the rolled format.

FIG. 3B illustrates a perspective view of the flexible membrane 300 in an undeployed state contained within the launch restraint cage 302, which is closed. The flexible membrane 300 is positioned on a payload base 304 from which extendable radial booms can be extended from radial boom ports 306. Restraint arms of the launch restraint cage 302 are shown as closed around the flexible membrane 300. In one implementation, the launch restraint cage 302 constrains the expansive load of the flexible membrane 300 in the rolled format.

Figures 3C, 3D:
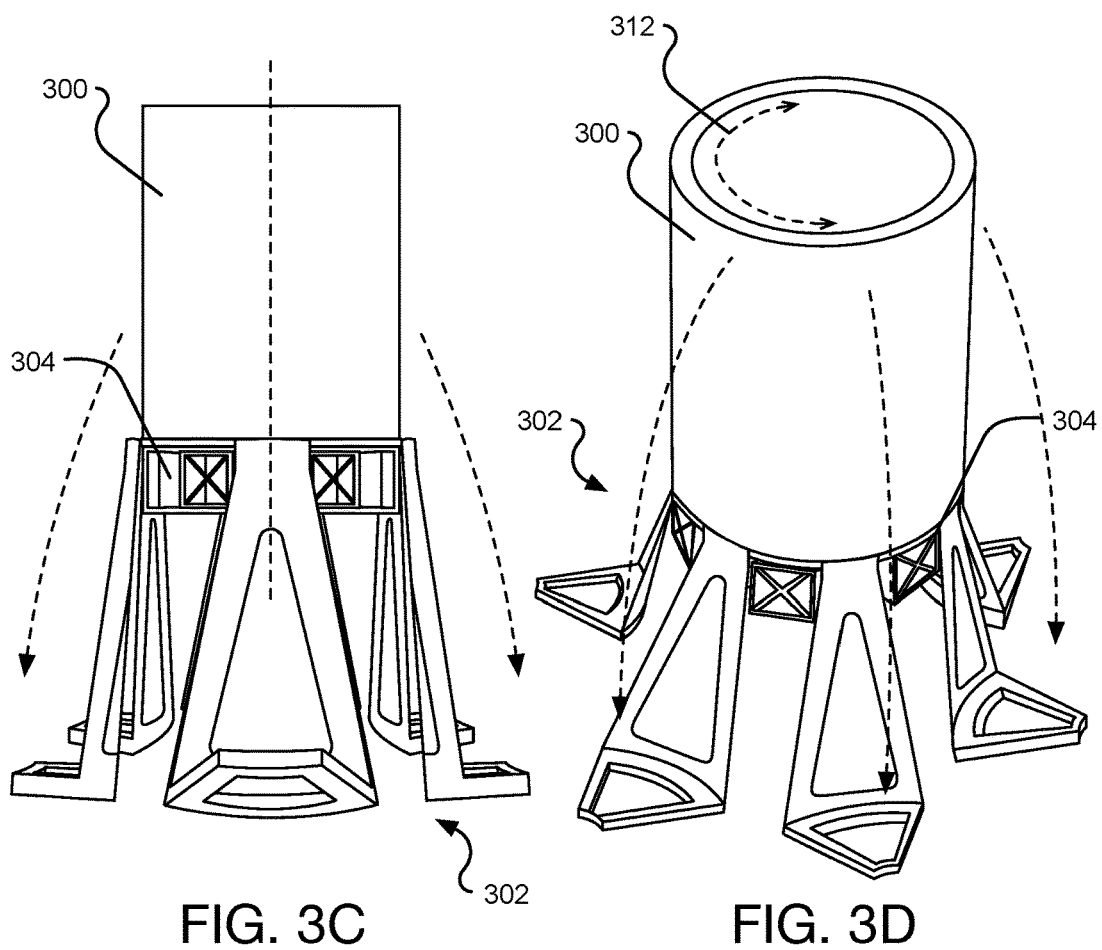

FIG. 3C illustrates a side view of the flexible membrane 300 in an undeployed state released from the launch restraint cage 302, which has been opened (by the expansive load of the flexible membrane 300 and/or by other motive forces such as additional springs or gears). In some implementation, the opening of the restraint arms of the launch restraint cage 302 is dampened to control the rate at which the restraint arms release. Such dampening can also release the expansive load of the rolled flexible membrane more slowly than without dampening.

The flexible membrane 300 is positioned on a payload base 304 from which extendable radial booms can be extended from radial boom ports 306. Restraint arms of the launch restraint cage 302 are shown as open from the flexible membrane 300, and the radial booms can extend between the spaces between the open restraint arms of the launch restraint cage 302. In one implementation, the launch restraint cage 302 no longer constrains the expansive load of the flexible membrane 300 in the rolled format. As such, while not shown in FIG. 3C, the flexible membrane 300 can begin to unroll, at least in part, as a result of this released expansive load (see, e.g., the partially unrolled flexible membrane 700 of FIG. 7A).

FIG. 3D illustrates a perspective view of the flexible membrane 300 in an undeployed state released from the launch restraint cage 302, which has been opened. The flexible membrane 300 is positioned on a payload base 304 from which extendable radial booms can be extended from radial boom ports 306. Restraint arms of the launch restraint cage 302 are shown as open from the flexible membrane 300, and the radial booms can extend between the spaces between the open restraint arms of the launch restraint cage 302. In one implementation, the launch restraint cage 302 no longer constrains the expansive load of the flexible membrane 300 in the rolled format. As such, while not shown in FIG. 3C, the flexible membrane 300 can begin to unroll (as shown by the dashed arrow 312), at least in part, as a result of this released expansive load (see, e.g., the partially unrolled flexible membrane 700 of FIG. 7A).

It should be understood that, while the flexible membrane 300 may begin to unroll about a roll axis (as suggested by the arrow 312) after the launch restraint cage 302 is opened (due to the released expansive load), in an alternative implementation, a rotation platform upon which the flexible membrane 300 is mounted can initially dampen, limit, or delay rotation after the launch restraint cage 302 is opened. Nevertheless, the ends of the folded and rolled flexible membrane 300 (e.g., on the outer circumference of the cylindrical geometric shape of the rolled flexible membrane 300) may begin to unroll or expand from the constrained shape, with or without rotation of the flexible membrane 300 on the rotation platform, as a result of the released expansive load.

The illustrated implementation shows six restraint arms 308 that hinge between a closed cage state and an open cage state. In other implementations, the launch restraint cage 302 may include a larger or smaller number of restraint arms. Furthermore, the six restraint arms 308 are shown as hinging from hinge locations 310 on the payload base 304 between the radial boom ports 306 and the flexible membrane 300. In other implementations, one or more of the restraint arms may hinge from locations on the other side of the payload base 304 (e.g., such that the radial boom powers 306 are positioned between the flexible membrane 300 and the hinge locations 310) or some other location.

Figure 4A:
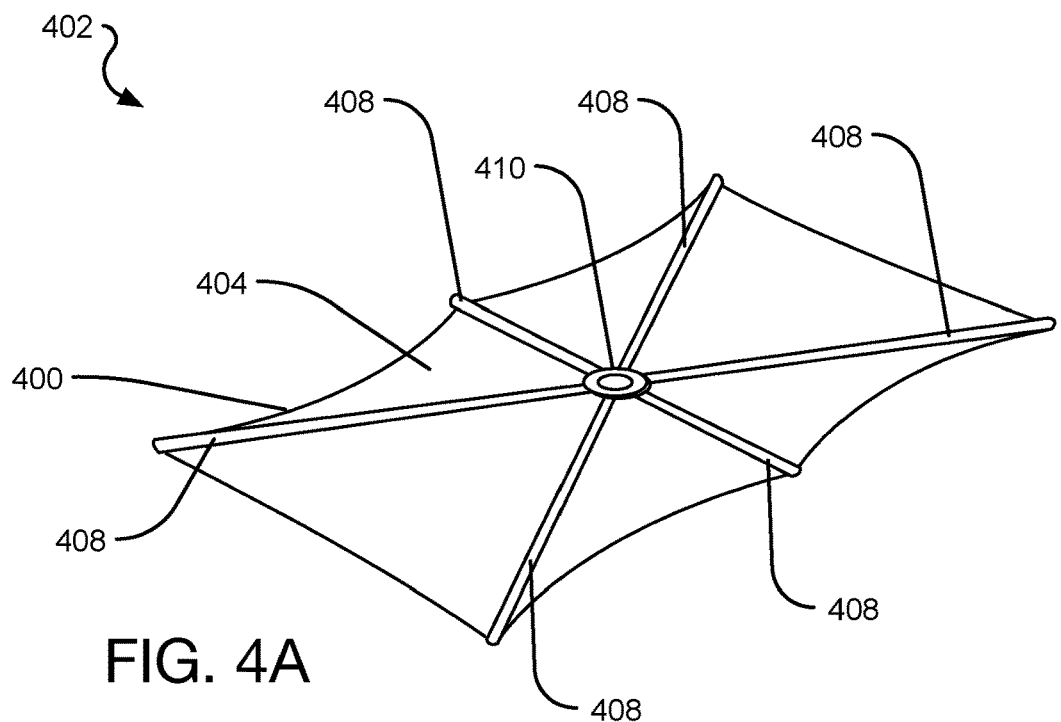
FIGS. 4A and 4B illustrate an example flexible membrane of a deployable system in a deployed state.
Figure 4B:
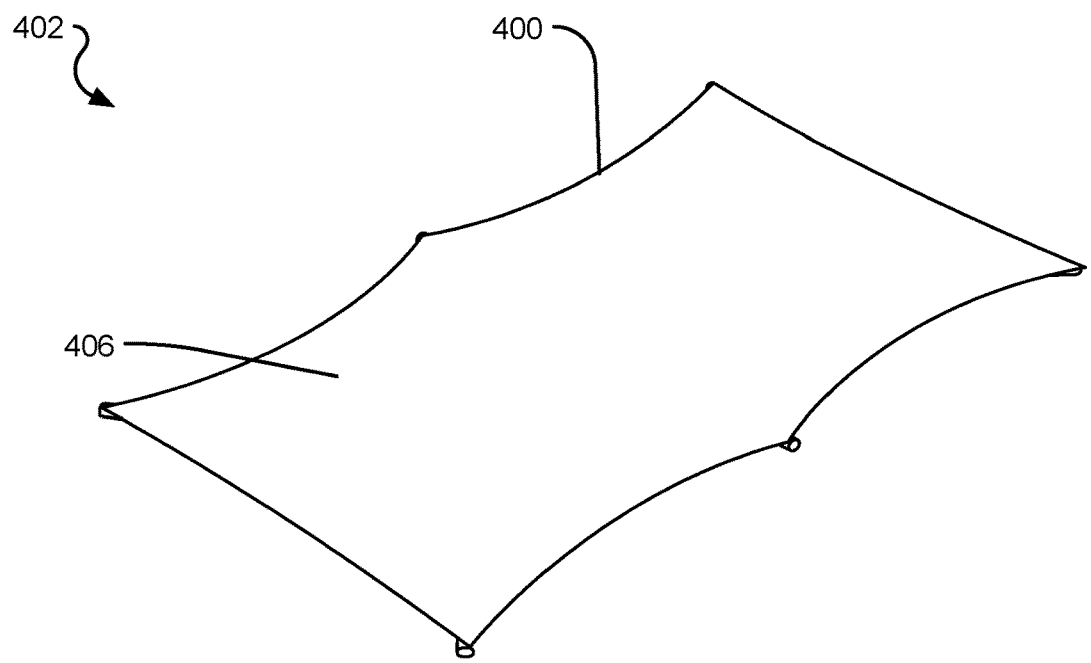

FIGS. 4A and 4B illustrate an example flexible membrane 400 of a deployable system 402 in a deployed state. The flexible membrane 400 includes a thin periphery region at the perimeter of the flexible membrane 400. The thin periphery region encloses an interior region comprising the majority of the flexible membrane area. The flexible membrane 400 is tensioned by extended radial booms 408 so as to form a surface with a first side 404 and a second side 406. In one implementation, the first side 404 of the flexible membrane 400 includes semi-rigid panels that support photovoltaic devices and the second side 406 of the flexible membrane 400 includes semi-rigid panels that support radiofrequency devices (e.g., of an RF antenna), although other devices (or no devices) may be employed on either side of the flexible membrane 400.

Notably, the deployed flexible membrane 400 is a continuous structure within the closed periphery formed by the outer perimeter of the flexible membrane 400 in both the deployed state and the undeployed state. For example, no radial or orthogonal boom or any portion of the payload base 410 penetrates the interior of the flexible membrane 400. Furthermore, the flexible membrane 400 is not deployed in multiple pieces or with disconnections between panels that are subsequently connected together.

Both the payload base 410 and the radial and orthogonal booms are located on one side of the continuous structure of the deployed flexible membrane 400. No portion of the payload base 410 is located adjacent to the second side 406 of the deployed flexible membrane 400. As such, the first side 404 of the deployed flexible membrane 400 is located between the second side 406 of the deployed flexible membrane 400 and the payload base 410. This configuration provides an external view of the second side 406 of the deployed flexible membrane as not portion of the second side 406 is obscured by the radial and orthogonal booms, the payload base, and the launch restraint cage.

The deployment structure of the payload base 410 includes six extendable radial booms 408 that, when extended, form a six-pointed star. The star defines a plane that is substantially parallel to the surface of the deployed flexible membrane, although the surface of the deployed flexible membrane may be planar, curved, undulating, or in the form of a similar surface. The deployment structure of the payload base 410 also includes an orthogonal boom, e.g., an out-of-plane boom (not shown) that, when extended, is substantially orthogonal to the plane defined by the extendable radial booms 408. One or more lanyards (not shown) extend from the end of the orthogonal boom to the distal end of each of the radial booms 408. The orthogonal boom and lanyards operate to support the tension on the radial booms 408 of the six-pointed star and, therefore, on the surface of the deployed flexible membrane 400. It should be understood that a larger or smaller number of booms may be employed in different implementations.

In the illustrated embodiment, each of the extendable booms may employ carpenter's tapes, battens, and diagonals, when deployed, to create an extendable boom. Other types of booms can be employed. For example, booms that employ flexible rods or telescoping rods or members can be employed. Further, the type of boom that can be employed may depend on the length over which the boom is designed to extend in the deployed state. For example, if the boom only needs to extend a relatively short distance, a boom realized with a single carpenter's tape may be feasible. Alternatively, one-dimensional extendable booms or telescoping rods or members may be beneficial to support larger area membranes. Further, in certain applications, an orthogonal boom may be unnecessary. Further, two or more different types of extendable booms can be employed if needed or desired.

Figure 5A:
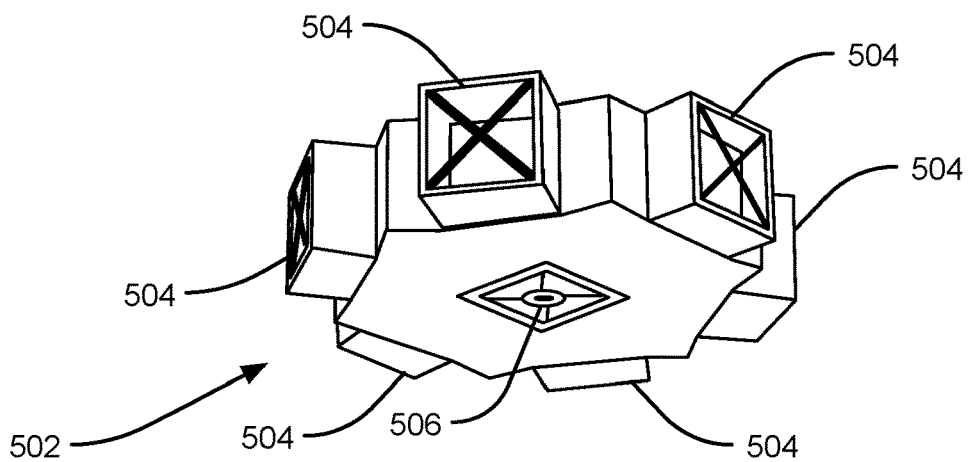
FIGS. 5A and 5B illustrate a payload base of an example deployable system.
Figure 5B:
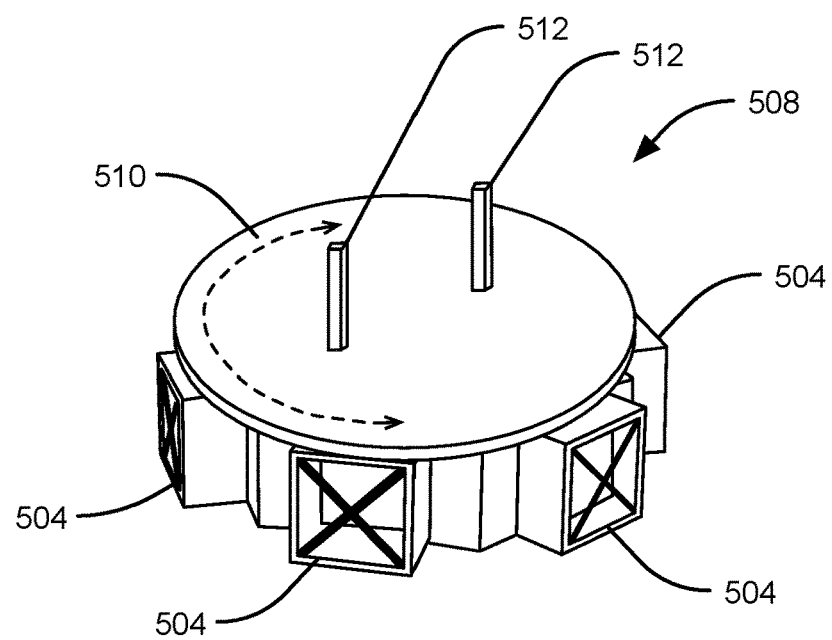

FIGS. 5A and 5B illustrate a payload base 500 of an example deployable system. The payload base 500 include a spacecraft bus or a satellite bus. As such, the payload base 500 may contain without limitation a variety of different sub-systems, such as any combination of navigation sub-systems, propulsion sub-systems, control sub-systems, communication sub-systems, power sub-systems, membrane-deploying sub-systems, and any other payload sub-systems used in a spacecraft or satellite bus.

FIG. 5A illustrates a first side 502 of the payload base 500, which faces away from the flexible membrane in both the undeployed state and the deployed state. Multiple radial boom ports 504 are provided to extend radial booms (not shown) from the payload base 500 during deployment. An orthogonal boom port 506 is positioned on the first side 502 of the payload base 500. An orthogonal boom (not shown) extends from the orthogonal boom port 506 during deployment, after which one or more lanyards (not shown) connect the distal end of the extended orthogonal boom to the distal ends of the radial booms.

FIG. 5B illustrates a second side 508 of the payload base 500, which faces the flexible membrane in both the undeployed state and the deployed state. Multiple radial boom ports 504 are provided to extend radial booms (not shown) from the payload base 500 during deployment. A rotational platform 510 is positioned on the second side 508 and can rotate about the roll axis. The rotational platform 510 is designed to be positioned between the payload base 500 and the flexible membrane in both the undeployed state and the deployed state.

One or more synchronization pins 512 are mounted on the rotational platform to releasably-anchor the rolled flexible membrane in the undeployed state and during at least part of the deployment. The rolled flexible membrane can be releasably anchored to the synchronization pins 512 in a variety of ways, such as by inserting a synchronization pin in a small-diameter loop of the flexible membrane in the interior of the cylindrical geometric shape, employing a sleeve into which a synchronization pin is inserted until some point in the deployment (at which point it releases) or some other manner. Rotation of the rotational platform 510 is synchronized with the extension of the radial booms to control the relative rates of unrolling and unfolding during deployment. In one implementation, the synchronization pins 512 fold down or retract at some point in the deployment so as not to interfere with the surface of the deployed flexible membrane.

While the description and drawings suggest the same number of synchronization pins as small-radius loops, it should be understood that the number of synchronization pins and small-radius loops in other implementations may vary and may include a different number of pins than loops. For example, a system may include two small-radius loops but only one synchronization pin.

Figure 6:
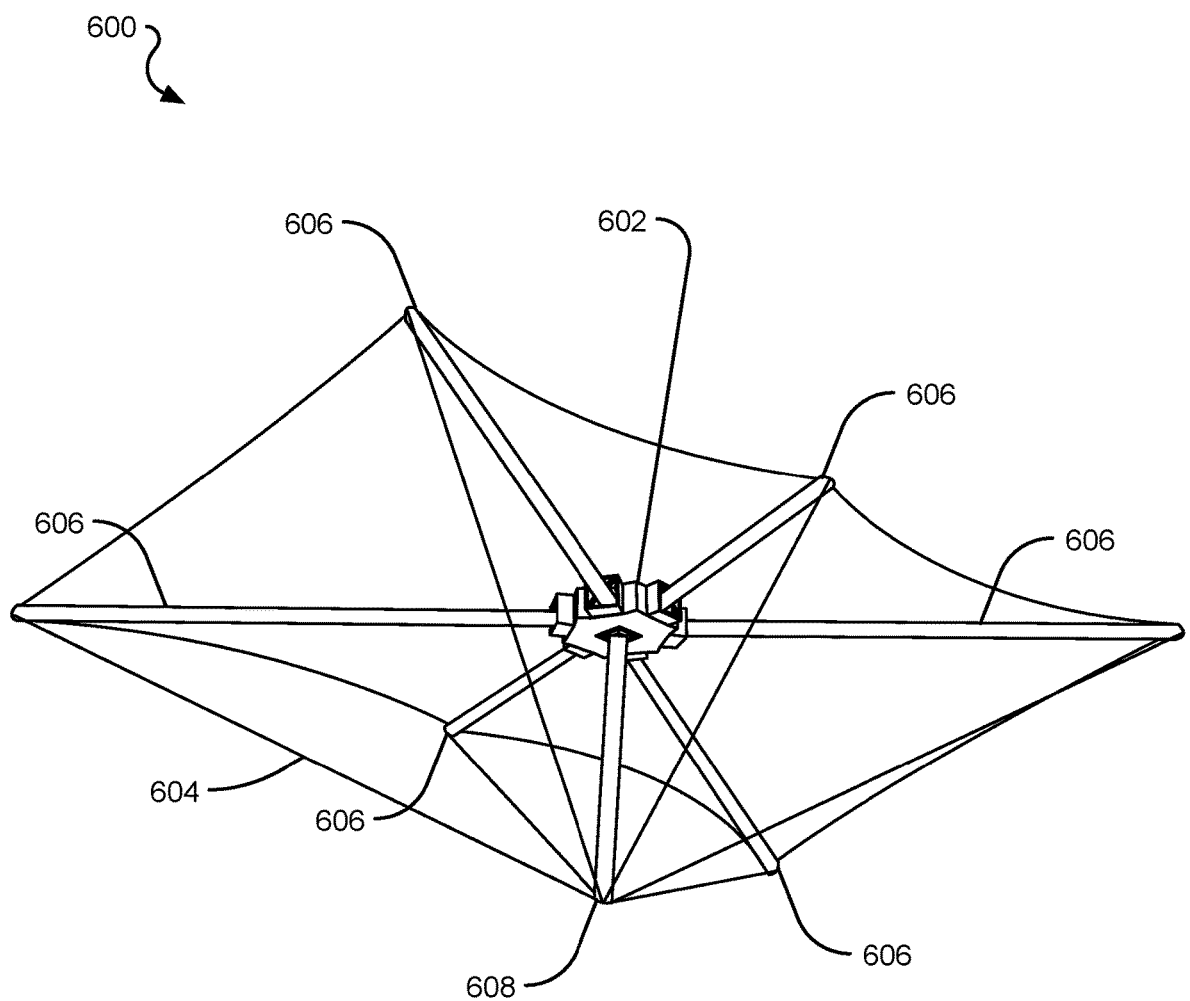
FIG. 6 illustrates an example deployable system in a deployed state, including a payload base attached to a flexible membrane.

FIG. 6 illustrates an example deployable system 600 in a deployed state, including a payload base 602 attached to a flexible membrane 604. In this deployed state, radial booms 606 have extended from the payload base 602, unrolling and unfolding the flexible membrane from its stowed format (e.g., a cylindrical geometric shape) to its expanded format having a larger area than the stowed format (e.g., to provide a planar surface, a roughly planar surface, a curved surface, or some other contoured surface. In one implementation, the flexible membrane 604 is to one side of the payload base 602 (out of plane), while the payload base 602 and the distal ends of the radial booms (when extended) are substantially in the same plane. As such, in the deployed state, the flexible membrane 604 is tensioned against or otherwise in contact with one face or surface of the payload base 602 to form a curved or contoured surface (as shown in FIG. 1) in the flexible membrane 604. In another implementation, the surface is flat or planar and may or may not be secured to the payload bus at the center of the payload base 602 or its rotational platform, synchronization pins, etc.

An orthogonal boom 608 is also shown to have extended from the payload base 602 (e.g., parallel to the roll axis and orthogonal to the z-fold axis and the plane of the distal ends of the radial booms) in the deployed state. One or more lanyards, tapes, or other connectors are attached between the distal end of the orthogonal boom 608 and the distal ends of the radial booms 606, to provide additional structural support in the deployed state.

FIGS. 7A-7D illustrate four phases of deployment of a flexible membrane of an example deployable system in a perspective view from a first side. The first side faces away from the payload base and booms, which therefore do not obscure any area of the first side after deployment. As such, this unobscured first side of the flexible membrane 700 is suitable for radiofrequency devices, although other devices may be employed.

Figure 7A:
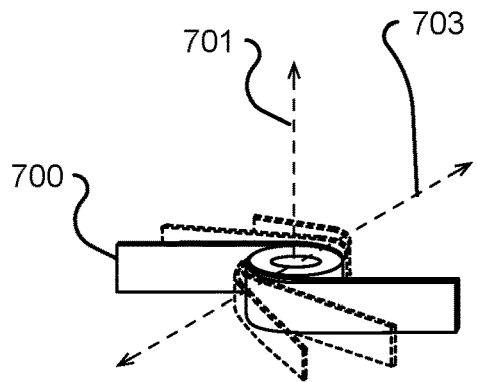
FIGS. 7A-7D illustrate four phases of deployment of a flexible membrane of an example deployable system in a perspective view from a first side.

FIG. 7A illustrates an early phase of deployment that includes an unrolling aspect in which the flexible membrane 700 rotates about a roll axis 701 on a rotational platform on the payload base (not shown). No unfolding along a z-fold axis 703 is shown in FIG. 7A, although both unrolling and unfolding can happen concurrently at the early phase(s) of deployment in some implementations.

Figure 7B:
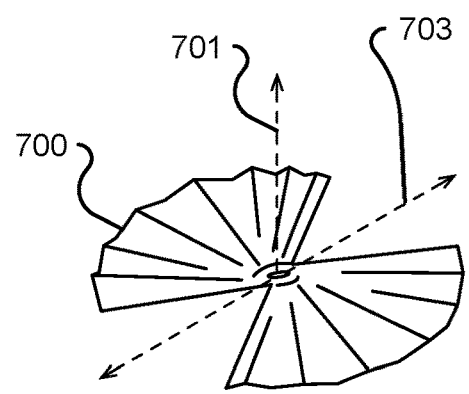
Figure 7C:
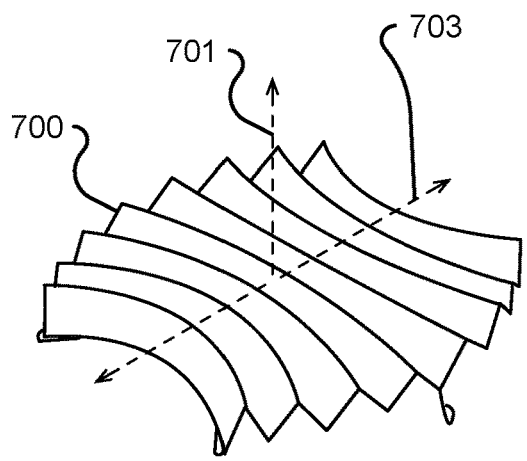
Figure 7D:
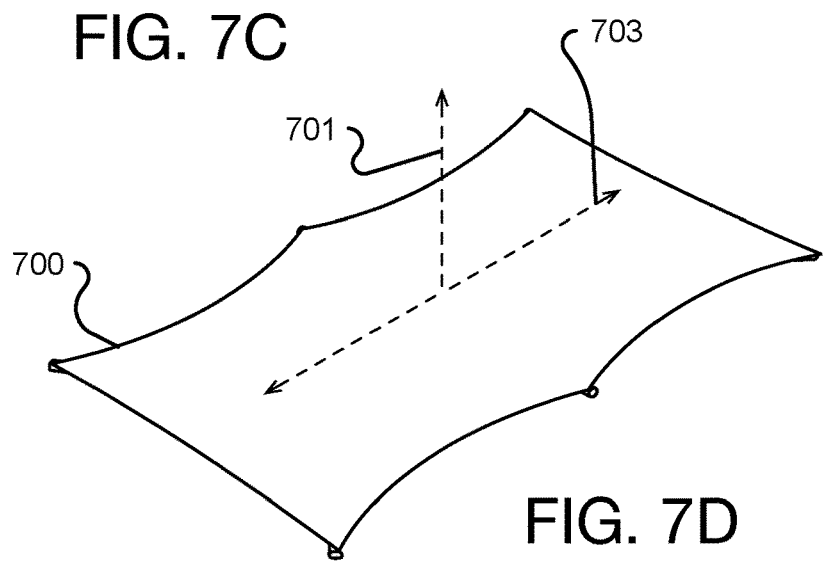

FIG. 7B illustrates a subsequent phase of deployment in which most of the unrolling has been completed, and deployment of the flexible membrane 700 is transitioning into a primarily or exclusively unfolding phase along the z-fold axis 703. FIG. 7C illustrates yet another subsequent phase of deployment of the flexible membrane 700 in which all of the unrolling has been completed, and deployment is transitioning into exclusively unfolding phase along the z-fold axis 703. FIG. 7D illustrates yet another subsequent phase of deployment in which the flexible membrane 700 has been fully unrolled and unfolded. The radial booms extend farther from the payload base with each successive phase. Accordingly, in the deployed state, the roll axis is substantially orthogonal to the flexible membrane surface, which lies along the z-fold axis.

Figure 8A:
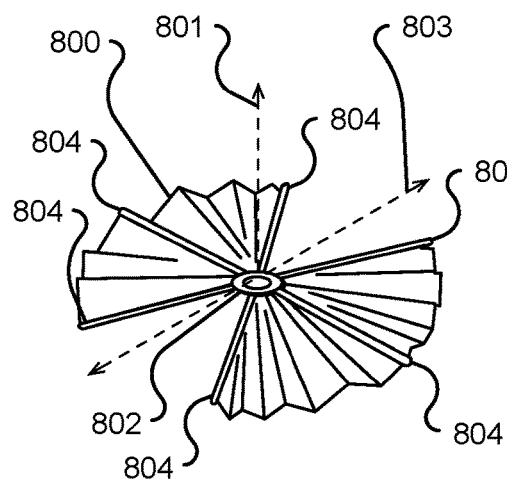
FIGS. 8A-8C illustrate three phases of deployment of a flexible membrane of an example deployable system in a perspective view from a second side.
Figure 8B:
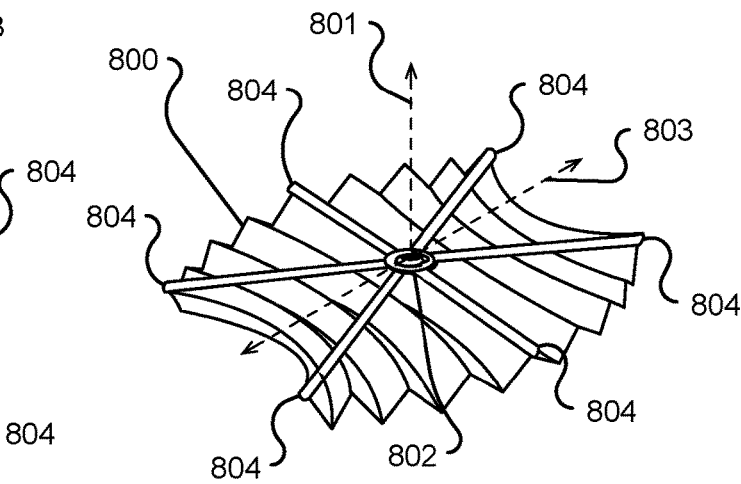
Figure 8C:
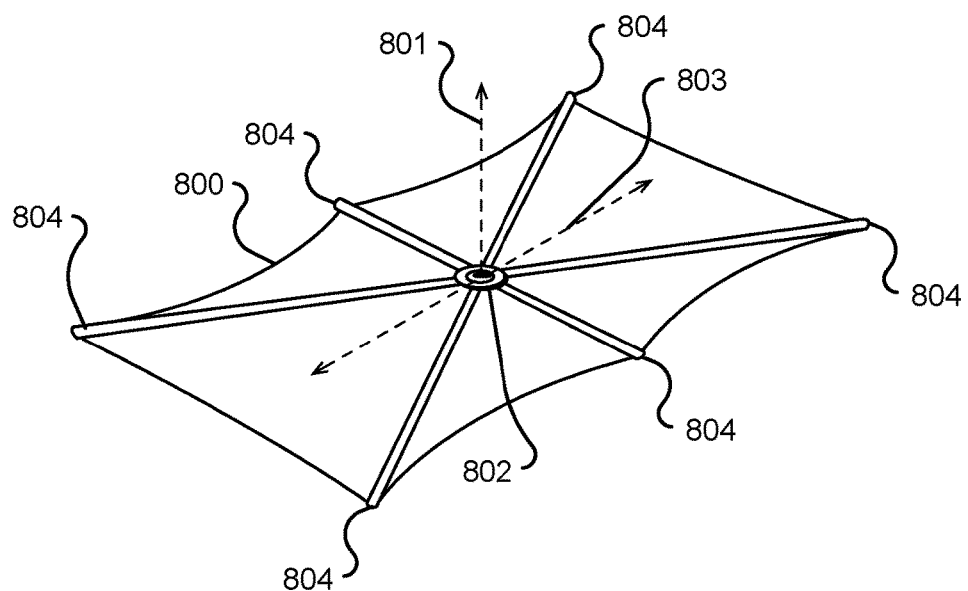

FIGS. 8A-8C illustrate three phases of deployment of a flexible membrane 800 of an example deployable system in a perspective view from a second side. The second side faces the payload base 802 and radial booms 804, which, therefore, can obscure one or more areas of the second side after deployment. As such, this obscured second side of the flexible membrane 800 is suitable for photovoltaic devices, although other devices may be employed.

An early phase (not shown) of deployment of the flexible membrane 800 includes an unrolling aspect in which the flexible membrane 800 rotates about a roll axis on a rotational platform on the payload base 802 without any unfolding along a z-fold axis, although both unrolling and unfolding can happen concurrently at the early phase(s) of deployment in some implementations.

FIG. 8A illustrates a subsequent phase of deployment in which most of the unrolling has been completed, and deployment of the flexible membrane 800 is transitioning into a primarily or exclusively unfolding phase along the z-fold axis. FIG. 8B illustrates yet another subsequent phase of deployment of the flexible membrane 800 in which all of the unrolling has been completed, and deployment is transitioning into exclusively unfolding phase along the z-fold axis. FIG. 8C illustrates yet another subsequent phase of deployment of the flexible membrane 800 in which the flexible membrane has been fully unrolled and unfolded. The radial booms 804 extend farther from the payload base 802 with each successive phase.

Figure 9:
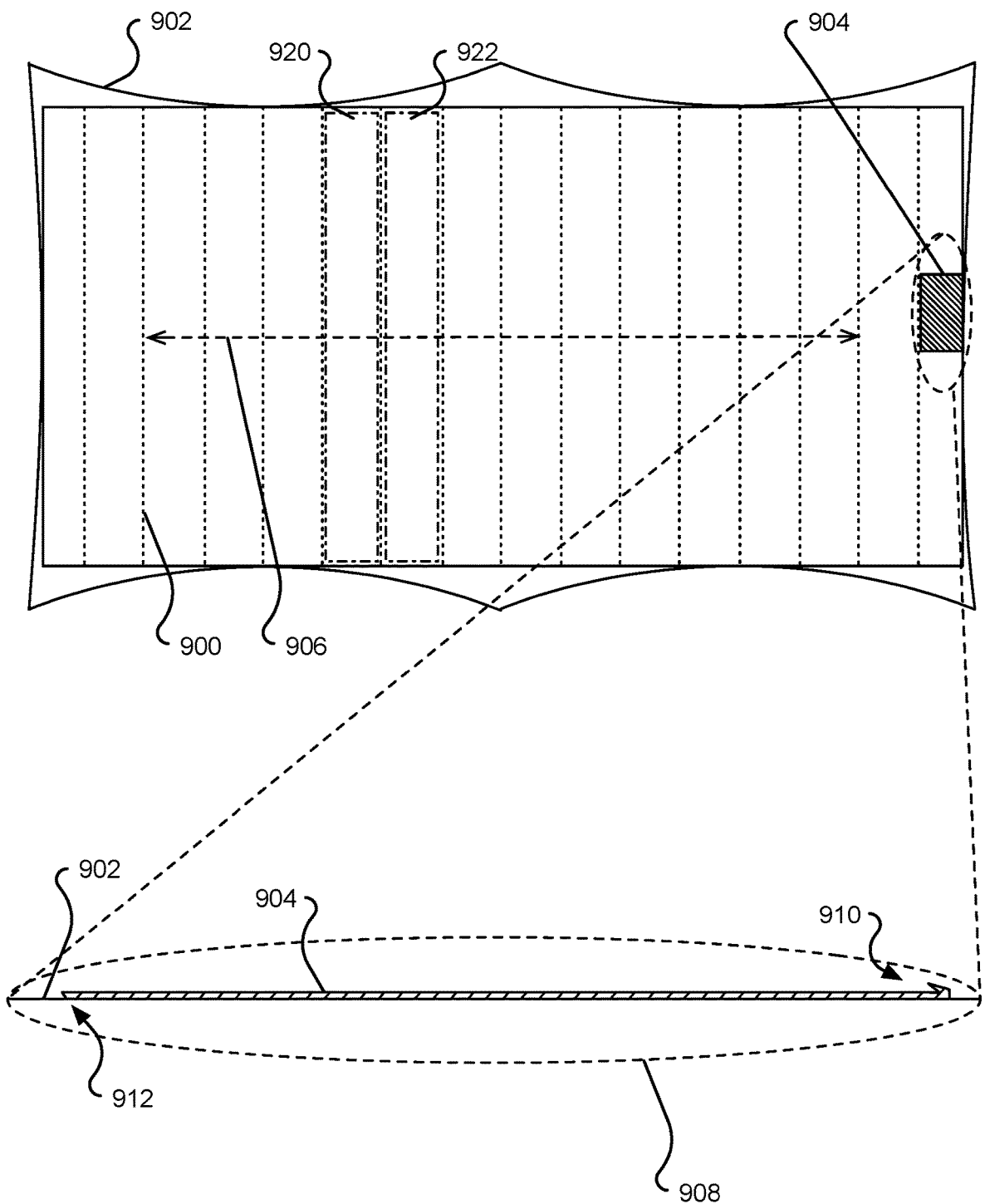
FIG. 9 illustrates z-fold lines in an example flexible membrane having a semi-rigid support member at one end of the example flexible membrane.

FIG. 9 illustrates z-fold lines (see, e.g., z-fold 900) in an example flexible membrane 902 having a semi-rigid support member 904 at one end of the example flexible membrane 902. The semi-rigid cylinder support member 904 is more rigid than the semi-rigid panels in the flexible membrane 902 (particularly sufficiently rigid along the roll axis to reduce or eliminate compression and/or collapsing of the cylindrical geometric shape), although it is still flexible enough to be rolled about the roll axis and/or into the small-radius loop. Numerous z-folds are shown in sequence along a z-fold axis 906. During some phases of deployment, the flexible membrane 902 is unfolded along the z-fold axis 906 as radial booms expand to their fully extended positions.

In one implementation, the flexible membrane 902 includes a thin flexible substrate fabric on which are mounted multiple panels (not shown) for supporting zero or more devices or portions of devices. Individual panels are attached to the thin flexible substrate fabric between each z-fold (such as in regions 920 and 922) so that the z-folds are between two or more adjacent panels. The thin flexible substrate fabric may be further perforated at the z-folds to facilitate controlled folding and unfolding. Furthermore, such perforations address a shearing issue between the panels adjacent panels separated by a z-fold. Such a shearing issue arises when the flexible membrane 902 is rolled after being first Z-folded.

In another implementation, the flexible membrane 902 includes multiple panels (not shown) without being mounted on a thin flexible substrate fabric. Instead, the two semi-rigid panels are positioned adjacent to each other (such as at regions 920 and 922) and connected to each other by one or more shear compliant connectors, such that the z-folds are positioned at the junction between the two adjacent panels.

The flexible membrane 902 also includes the semi-rigid support member 904 that serves to prevent the flexible membrane 902, when in the undeployed state, from collapsing inward in the cylindrical geometric shape. Such a collapse could prevent subsequent deployment of the flexible membrane 902.

With reference to the blow-out view 908 of FIG. 9, the semi-rigid support member 904 includes a hook structure 910 and a beveled end 912 that captures the hook structure 910 when the flexible membrane 902 is rolled to prevent the ends of a relatively rigid interior wall established with the semi-rigid support member 904 from slipping past one another.

Figure 10:
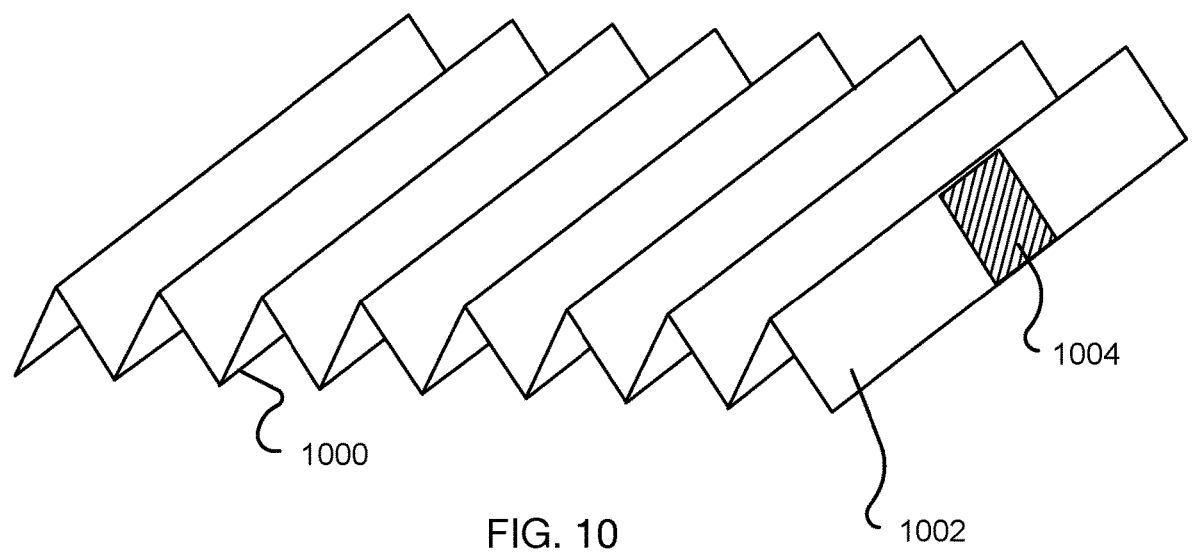
FIG. 10 illustrates partially folded z-folds in an example flexible membrane having a semi-rigid support member at one end of the example flexible membrane.

FIG. 10 illustrates partially folded z-folds (such as z-fold 1000) in an example flexible membrane 1002 having a semi-rigid support member 1004 at one end of the example flexible membrane 1002. Unfolding along a z-fold axis of the flexible membrane 1002 is an early step in transitioning the flexible membrane 1002 from the undeployed state shown into a deployed state.

Figure 11A:
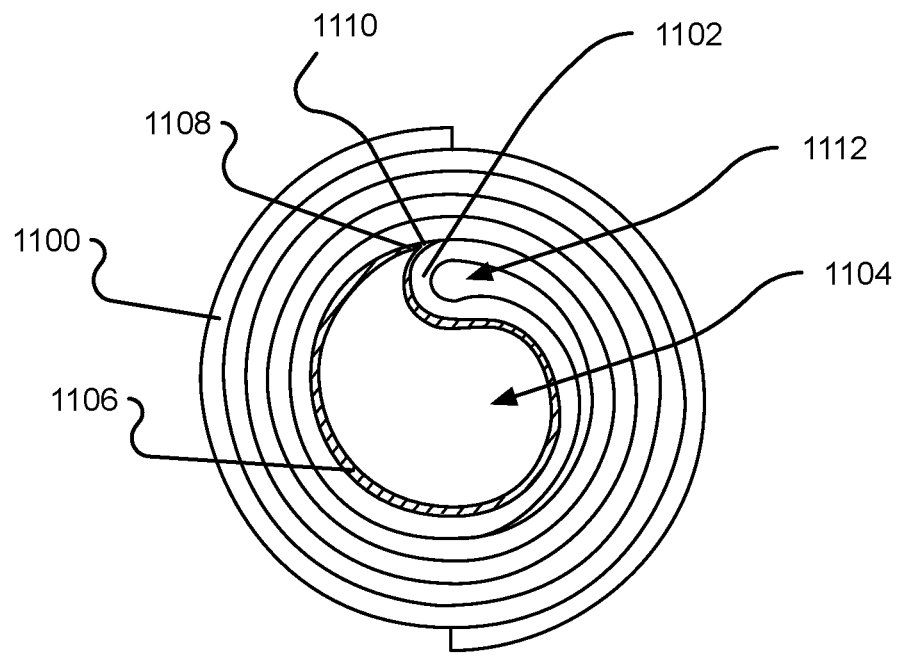
FIGS. 11A-11B illustrate an example flexible membrane rolled about a roll axis into a cylindrical geometric shape of an undeployed state and having a small-radius loop positioned within the interior of the cylindrical geometric shape.
Figure 11B:
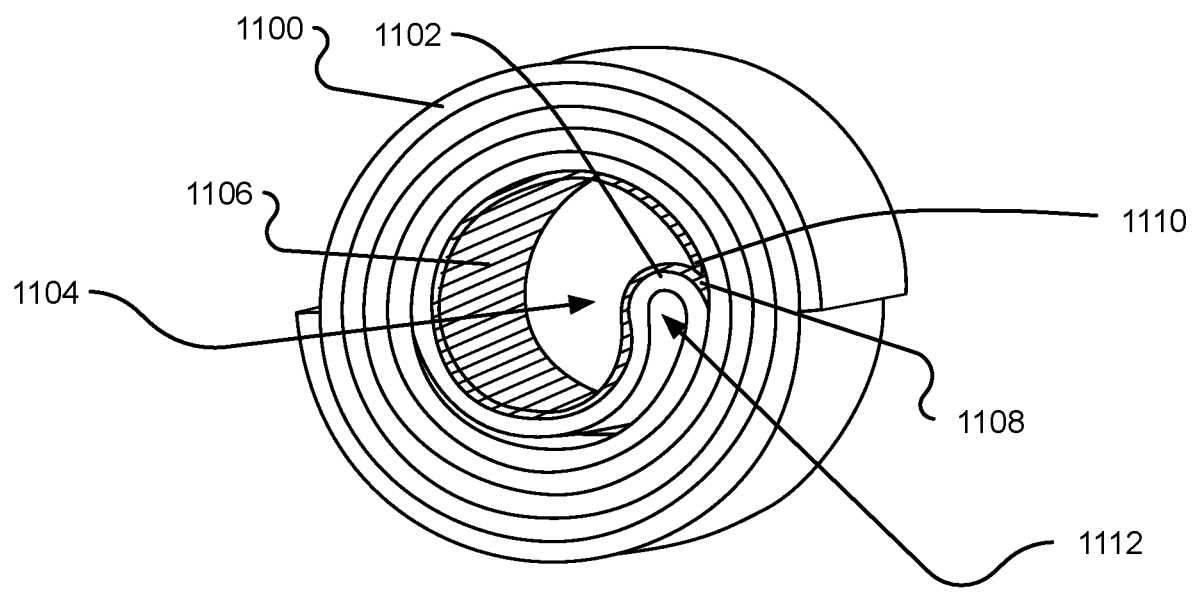

FIG. 11A illustrates a top view and FIG. 11B illustrates a perspective view of an example flexible membrane 1100 rolled about a roll axis into a cylindrical geometric shape of an undeployed state and having a small-radius loop 1102 positioned within the interior 1104 of the cylindrical geometric shape. After the flexible membrane 1100 has been z-folded into layers of stacked panels, the flexible membrane 1100 is rolled beginning near the middle of the flexible membrane 1100 (e.g., of the stacked panels) resulting from the z-folding so that a semi-rigid support member 1106 (see, e.g., semi-rigid support member 904 of FIG. 9) can form an inner wall of the undeployed flexible membrane 1100 within the interior of the cylindrical geometric shape. The beveled end 1110 of the semi-rigid support member 1106 is captured by the hook structure 1108 of the semi-rigid support member 1106 to prevent the ends of the rigid wall from slipping past one another. Notably, by rolling from the middle of the stack of panels associated with the z-folded membrane, the small radius loop 1102 is formed in the undeployed flexible membrane 1100 in the interior of the cylindrical geometric shape. Also, in the illustrated implementations, the wall of the interior of the cylindrical geometric shape is established using the semi-rigid support member 1106 and forms a relatively large "comma" or "paisley-like" shape in relation to the small radius loop 1102, which forms a loop space 1112 with a relatively small "comma" or "paisley-like" shape.

Figure 12:
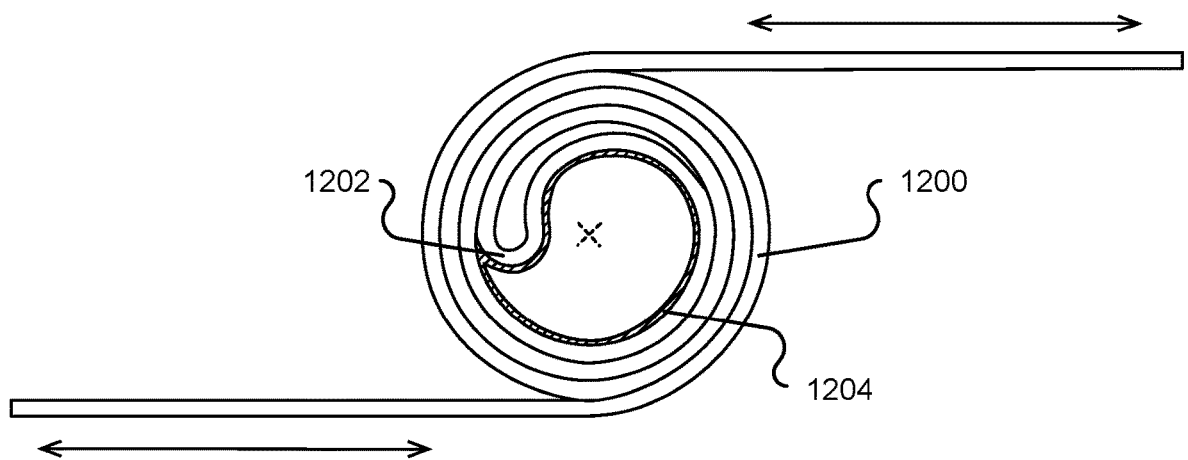
FIG. 12 illustrates a rolling and unrolling of an example flexible membrane about a roll axis between an undeployed state and a (partially) deployed state, wherein the flexible membrane forms a cylindrical geometric shape with a small-radius loop positioned within the interior of the cylindrical geometric shape.

FIG. 12 illustrates a rolling and unrolling of an example flexible membrane 1200 about a roll axis (indicated by the dashed line "x" at the center of the roll) between an undeployed state and a (partially) deployed state, wherein the flexible membrane 1200 forms a cylindrical geometric shape with a small-radius loop positioned within the interior of the cylindrical geometric shape. In one implementation, the small-radius loops 1202 is formed as an initial bend or roll at or near the middle of the z-folded flexible membrane. After the initial bend or roll (which results in the small-radius loop 1202), the remaining length of the z-folded flexible membrane is rolled around the small-radius loop 1202 to form the cylindrical geometric shape that exists in the undeployed state. A semi-rigid support member 1204 forms at least a portion of the interior wall of the cylindrical geometric shape to provide structural support to the flexible membrane 1200. During deployment, the rolled and z-folded flexible membrane is unrolled about the roll axis and unfolded to reach the deployed state.

Figure 13:
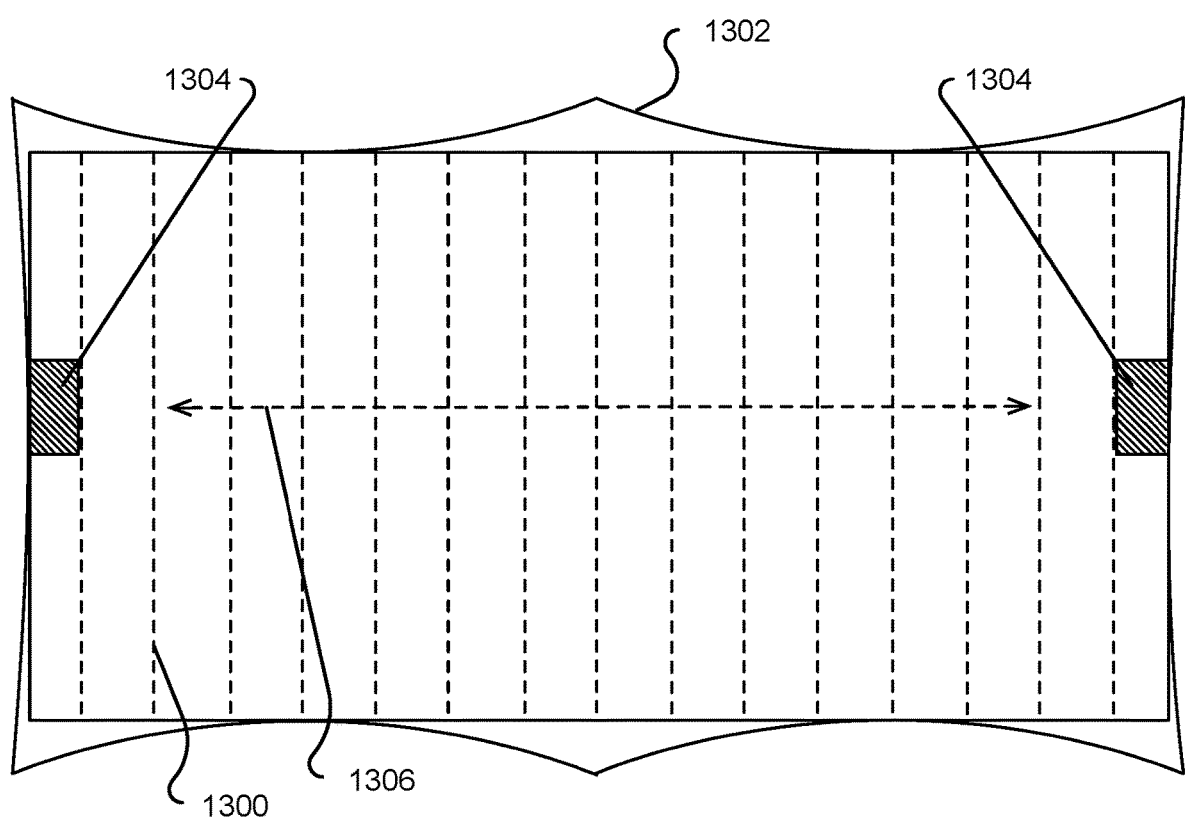
FIG. 13 illustrates z-fold lines in an example flexible membrane having semi-rigid support members at opposite ends of the example flexible membrane.

FIG. 13 illustrates z-fold lines (see, e.g., z-fold 1300) in an example flexible membrane 1302 having semi-rigid support members 1304 at opposite ends of the example flexible membrane. Numerous z-folds are shown in sequence along a z-fold axis 1306. During some phases of deployment, the flexible membrane 1302 is unfolded along the z-fold axis 1306 as radial booms expand to their fully extended positions.

In one implementation, the flexible membrane 1302 includes a thin flexible substrate fabric on which are mounted multiple panels (not shown) for supporting zero or more devices or portions of devices. Individual panels are attached to the thin flexible substrate fabric between each z-fold so that the z-folds are between two or more adjacent panels. The thin flexible substrate fabric may be further perforated at the z-folds to facilitate controlled folding and unfolding. Furthermore, such perforations address a shearing issue between the panels adjacent panels separated by a z-fold. Such a shearing issue arises when the flexible membrane 1302 is rolled after being first z-folded.

In another implementation, the flexible membrane 1302 includes multiple panels (not shown) without being mounted on a thin flexible substrate fabric. Instead, the two semi-rigid panels are positioned adjacent to each other and connected to each other by one or more shear compliant connectors, such that the z-folds are positioned at the junction between the two adjacent panels.

The flexible membrane 1302 also includes multiple semi-rigid support members 1304 that serve to prevent the flexible membrane 1302, when in the undeployed state, from collapsing inward in the cylindrical geometric shape. Such a collapse could prevent subsequent deployment of the flexible membrane 1302. In the illustrated implementation, the semi-rigid support members 1304 are positioned near the middle of opposite ends of the flexible membrane 1302 along the z-fold axis. 1306.

As discussed with reference to the blow-out view 908 of FIG. 9, the semi-rigid support members 1304 each include a hook structure and a beveled end that captures the hook structure when the flexible membrane is rolled to prevent the ends of a relatively rigid interior wall established with the semi-rigid support member 1304 from slipping past one another.

Figure 14A:
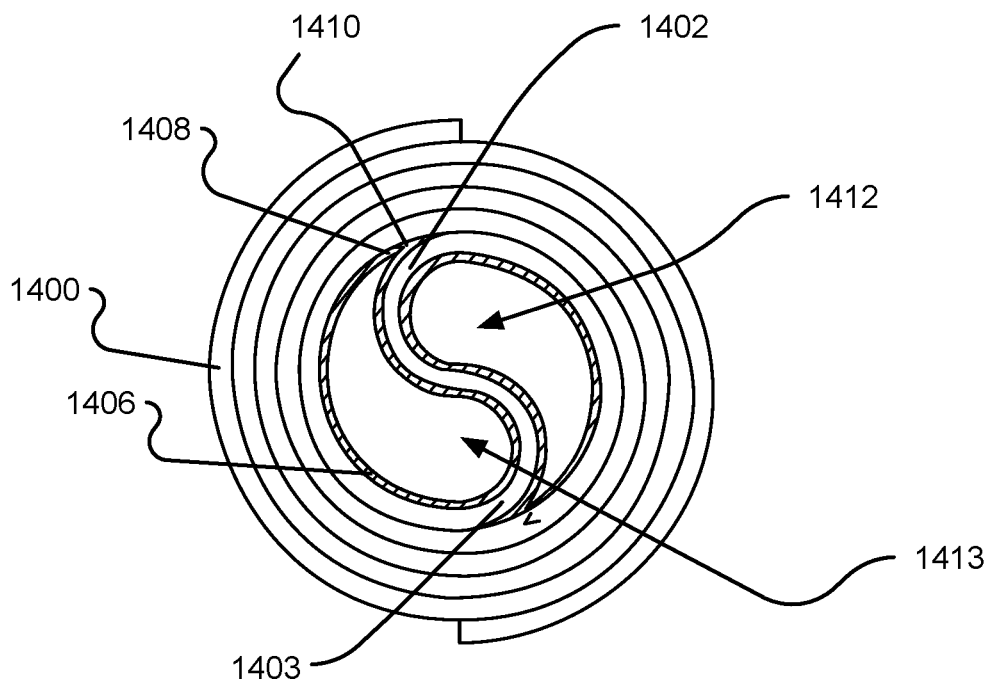
FIGS. 14A-14B illustrate an example flexible membrane rolled about a roll axis into a cylindrical geometric shape of an undeployed state and having two small-radius loops positioned within the interior of the cylindrical geometric shape.
Figure 14B:
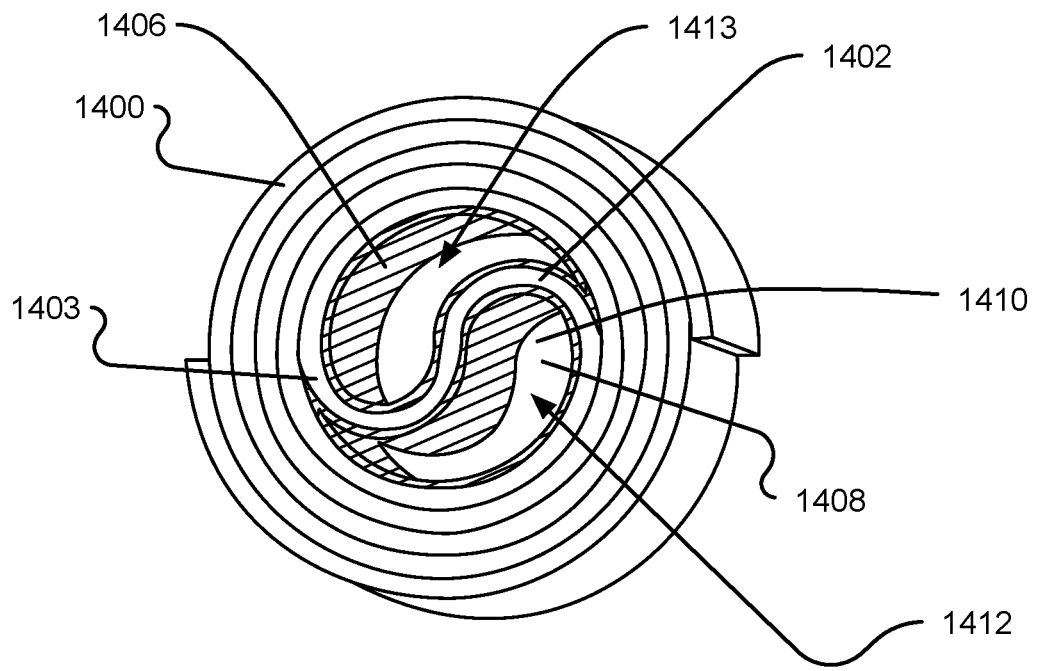

FIGS. 14A-14B illustrate an example flexible membrane rolled about a roll axis into a cylindrical geometric shape of an undeployed state and having two small-radius loops positioned within the interior of the cylindrical geometric shape. FIG. 14A illustrates a top view and FIG. 14B illustrates a perspective view of an example flexible membrane 1400 rolled about a roll axis into a cylindrical geometric shape of an undeployed state and having a first small-radius loop 1402 and a second small-radius loop 1403 positioned within the interior of the cylindrical geometric shape.

After the flexible membrane 1400 has been z-folded into layers of stacked panels, the flexible membrane 1400 is rolled beginning near the middle of the flexible membrane 1400 (e.g., of the stacked panels) resulting from the z-folding so that a semi-rigid support members 1406 (see, e.g., semi-rigid support member 1304 of FIG. 13) can form inner walls of the undeployed flexible membrane 1400 within the interior of the cylindrical geometric shape. The beveled ends 1410 of each semi-rigid support member 1406 is captured by the hook structure 1408 of the semi-rigid support member 1406 to prevent the ends of the rigid wall from slipping past one another. Notably, by rolling from the middle of the stack of panels associated with the z-folded membrane, the small radius loop 1402 and 1403 are formed in the undeployed flexible membrane 1400 in the interior of the cylindrical geometric shape. Also, in the illustrated implementations, the wall of the interior of the cylindrical geometric shape is established using the semi-rigid support members 1406 and form two loop spaces 1412 and 1413 with relatively small "comma" or "paisley-like" shapes (as compared to the radius of the interior of the cylindrical geometric shape).

Figure 15:
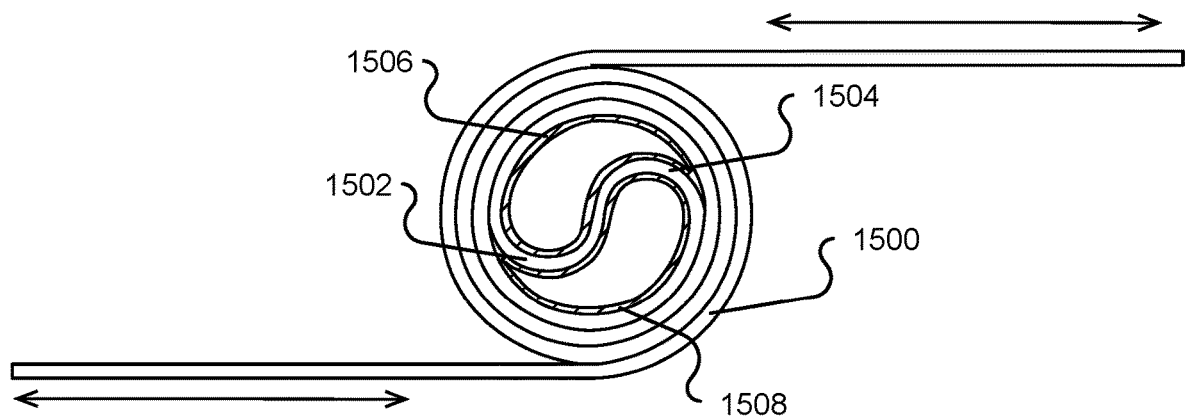
FIG. 15 illustrates a rolling and unrolling of an example flexible membrane about a roll axis (indicated by the dashed line "x" at the center of the roll) between an undeployed state and a (partially) deployed state, wherein the flexible membrane forms a cylindrical geometric shape with two small-radius loops positioned within the interior of the cylindrical geometric shape.

FIG. 15 illustrates a rolling and unrolling of an example flexible membrane 1500 about a roll axis (indicated by the dashed line "x" at the center of the roll) between an undeployed state and a (partially) deployed state, wherein the flexible membrane 1500 forms a cylindrical geometric shape with two small-radius loops 1502 and 1504 positioned within the interior of the cylindrical geometric shape. In one implementation, the small-radius loops 1502 and 1504 are formed as initial bends at or near the middle of the z-folded flexible membrane. After the initial bends (which result in the small-radius loops 1502 and 1504), the remaining length of the z-folded flexible membrane is rolled around the small-radius loops 1502 and 1504 to form the cylindrical geometric shape that exists in the undeployed state. Two semi-rigid support members 1506 and 1508 form at least a portion of the interior wall of the cylindrical geometric shape to provide structural support to the flexible membrane 1500. During deployment, the rolled and z-folded flexible membrane is unrolled about the roll axis and unfolded to reach the deployed state.

Figure 16:
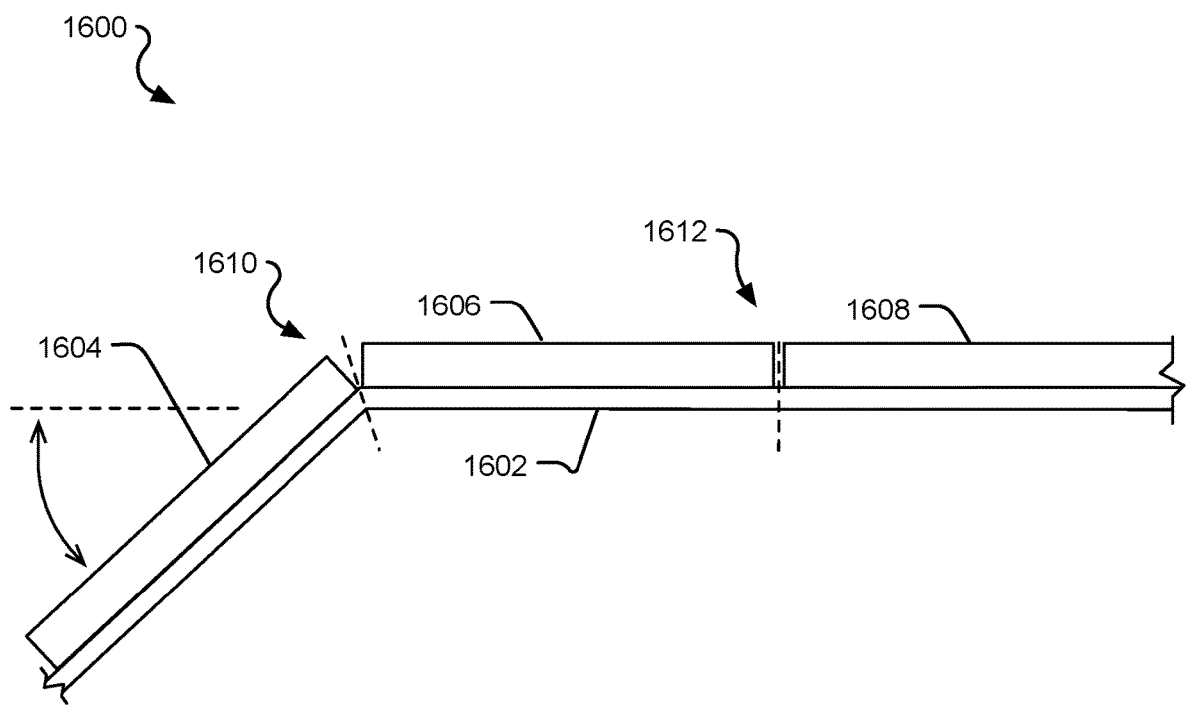
FIG. 16 illustrates a phase of z-folding operation on an example flexible membrane.

FIG. 16 illustrates a phase of z-folding operation on an example flexible membrane 1600. The flexible membrane 1600 includes a thin continuous flexible substrate fabric 1602 and one or more semi-rigid panels (see, e.g., panels 1604, 1606, and 1608) mounted to at least one side surface of the thin continuous flexible substrate fabric 1602. (In FIG. 16, the panels are only shown as mounted on one side surface of the thin continuous flexible substrate fabric 1602, although, in other implementations, panels may also be mounted on the opposite side surface of the thin continuous flexible substrate fabric 1602.) Each semi-rigid panel can support zero or more devices or portions of devices.

A z-fold location 1610 is shown at the junction between adjacent panels 1604 and 1606. The panel 1604 can be folded at the z-fold location 1610 relative to the panel 1606 as the flexible membrane 1600 is being transitioned to an undeployed state and can be unfolded at the z-fold location 1610 as the flexible membrane 1600 is being expanded to a deployed state. A junction is shown between the panels 1606 and 1608, although the flexible membrane 1600 is not shown as folded in FIG. 16 at the corresponding z-fold location 1612.

Figure 17:
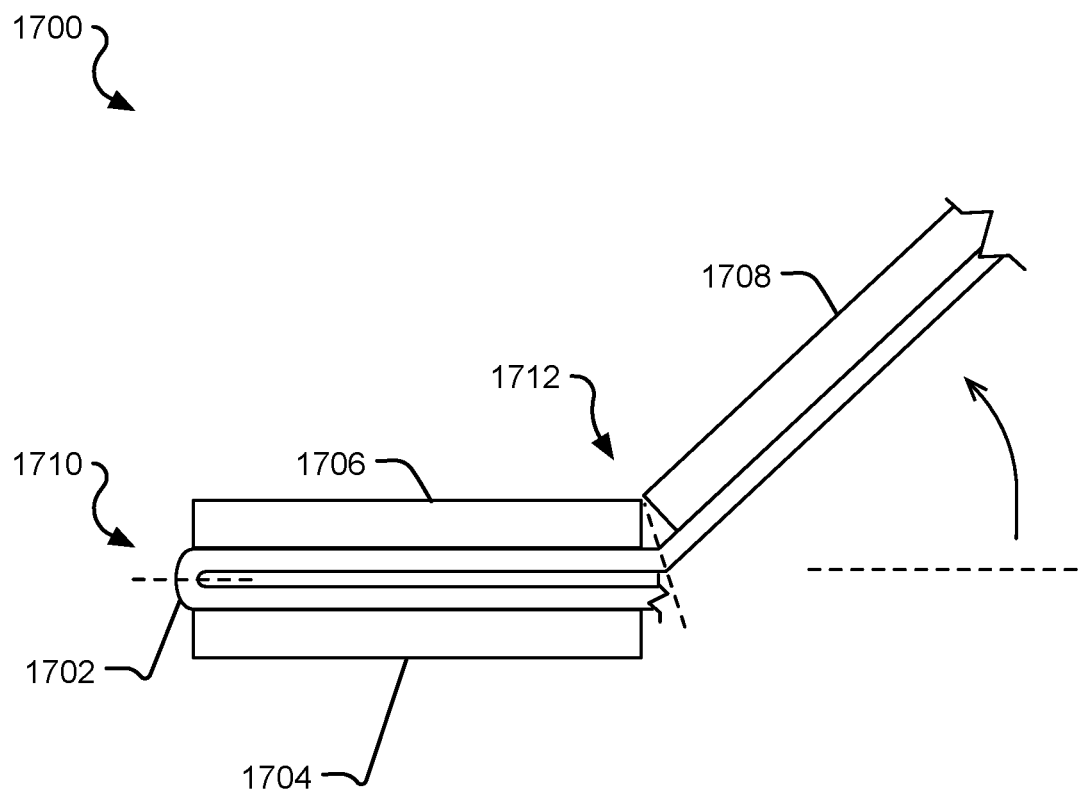
FIG. 17 illustrates another phase of z-folding operation on an example flexible membrane.

FIG. 17 illustrates another phase of z-folding operation on an example flexible membrane 1700. The flexible membrane 1700 includes a thin continuous flexible substrate fabric 1702 and one or more semi-rigid panels (see, e.g., panels 1704, 1706, and 1708) mounted to at least one side surface of the thin continuous flexible substrate fabric 1702. (In FIG. 17, the panels are only shown as mounted on one side surface of the thin continuous flexible substrate fabric 1702, although, in other implementations, panels may also be mounted on the opposite side surface of the thin continuous flexible substrate fabric 1702.) Each semi-rigid panel can support zero or more devices or portions of devices.

A z-fold location 1710 is shown at the junction between adjacent panels 1704 and 1706. The panel 1704 has been folded at the z-fold location 1710 relative to the panel 1706 as the flexible membrane 1700 is being transitioned to an undeployed state and can be unfolded at the z-fold 1710 as the flexible membrane 1700 is being expanded to a deployed state. Furthermore, another z-fold location 1712 is shown at the junction between adjacent panels 1706 and 1708. The panel 1708 can be folded at the z-fold location 1712 relative to the panel 1706 as the flexible membrane 1700 is being transitioned to an undeployed state and can be unfolded at the z-fold locations 1710 and 1712 as the flexible membrane 1700 is being expanded to a deployed state.

Figure 18:
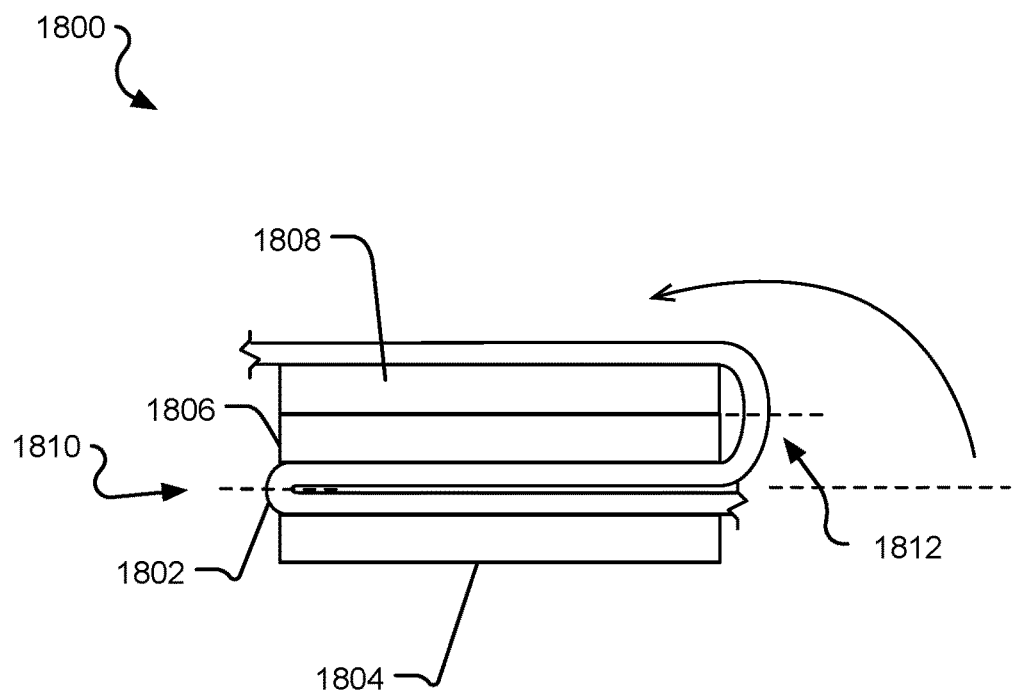
FIG. 18 illustrates yet another phase of z-folding operation on an example flexible membrane.

FIG. 18 illustrates yet another phase of z-folding operation on an example flexible membrane. The flexible membrane 1800 includes a thin continuous flexible substrate fabric 1802 and one or more semi-rigid panels (see, e.g., panels 1804, 1806, and 1808) mounted to at least one side surface of the thin continuous flexible substrate fabric 1802. (In FIG. 18, the panels are only shown as mounted on one side surface of the thin continuous flexible substrate fabric 1802, although, in other implementations, panels may also be mounted on the opposite side surface of the thin continuous flexible substrate fabric 1802.) Each semi-rigid panel can support zero or more devices or portions of devices.

A z-fold location 1810 is shown at the junction between adjacent panels 1804 and 1806. The panel 1804 has been folded at the z-fold location 1810 relative to the panel 1806 as the flexible membrane 1800 is being transitioned to an undeployed state and can be unfolded at the z-fold 1810 as the flexible membrane 1800 is being expanded to a deployed state. Furthermore, another z-fold location 1812 is shown at the junction between adjacent panels 1806 and 1808. The panel 1808 can be folded at the z-fold location 1812 relative to the panel 1806 as the flexible membrane 1800 is being transitioned to an undeployed state and unfolded at the z-fold locations 1810 and 1812 as the flexible membrane 1800 is being expanded to a deployed state.

The thin continuous flexible substrate fabric 1802 (e.g., with perforations along the z-fold locations) provides a shear compliant connection at the junction between adjacent panels. In the undeployed state, the flexible membrane 1800 forms a stack of connected panels mounted on the thin continuous flexible substrate fabric 1802. In a deployed state, the flexible membrane 1800 forms an expanded and continuous membrane of connected panels mounted on the thin continuous flexible substrate fabric 1802.

Figure 19:
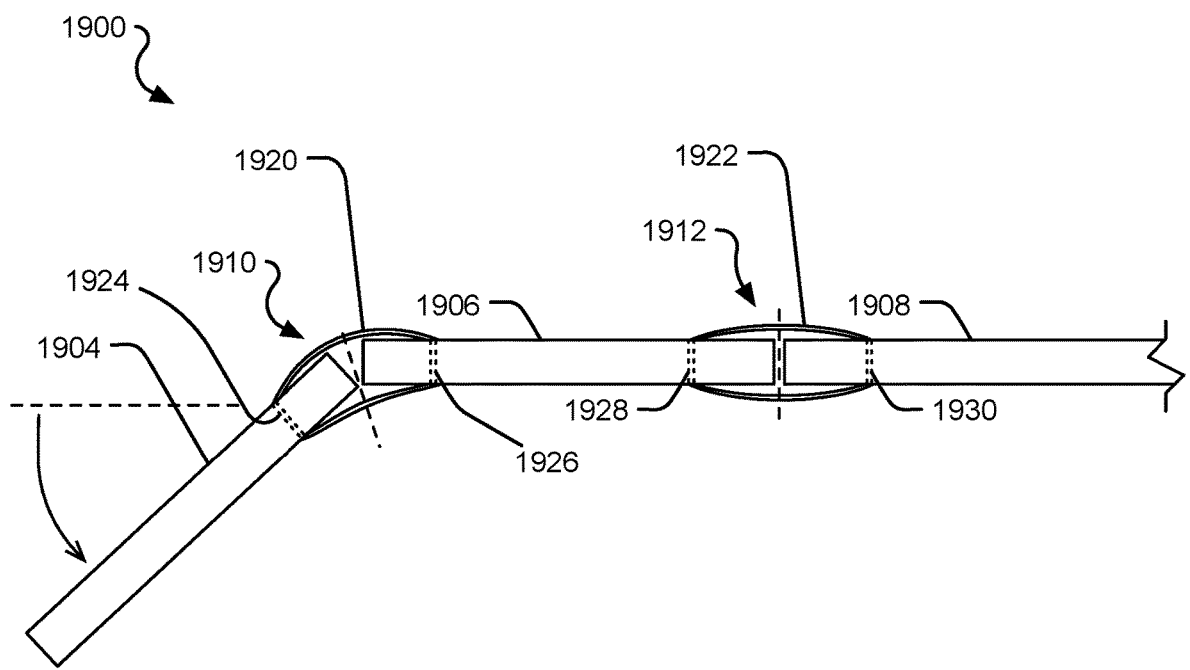
FIG. 19 illustrates a phase of z-folding operation on an example flexible membrane.

FIG. 19 illustrates a phase of z-folding operation on an example flexible membrane 1900. The flexible membrane 1900 includes semi-rigid panels (see, e.g., panels 1904, 1906, and 1908) connected by one or more shear compliant connectors (see, e.g., connectors 1920 and 1922). In one implementation, the shear compliant connectors are configured as loop connectors that slide through apertures (e.g., apertures 1924, 1926, 1928, and 1930) along the edge and in the interior of each panel, although other shear compliant connectors implementations may be employed. Such connectors may be looped through interior region apertures in the panels, pivotably anchored to the surfaces of the panels in the interior region of the panels, or otherwise pivotably fastened to the interior region of the panels. In another implementation, such connectors are fixed (e.g., not pivotably anchored) in their attachment to the interior region of the panels and have enough flexibility to accommodate shear motion. In some implementations, the connectors all connect to the same side of the flexible membrane 1900. In other implementations, the connectors connector on both sides of the flexible membrane 1900 and/or weave throughout multiple panels on both sides of the flexible membrane 1900.

Each panel can support devices on one or both sides of the panels. In another implementation, each panel includes at least two panel layers, with devices supported on one side of each panel layer. Each semi-rigid panel or panel layer can support zero or more devices or portions of devices.

A z-fold location 1910 is shown at the junction between adjacent panels 1904 and 1906. The panel 1904 can be folded at the z-fold location 1910 relative to the panel 1906 as the flexible membrane 1900 is being transitioned to an undeployed state and can be unfolded at the z-fold location 1910 as the flexible membrane 1900 is being expanded to a deployed state. A junction is shown between the panels 1906 and 1908, although flexible membrane 1900 is not shown as folded in FIG. 19 at the corresponding z-fold location 1912.

Figure 20:
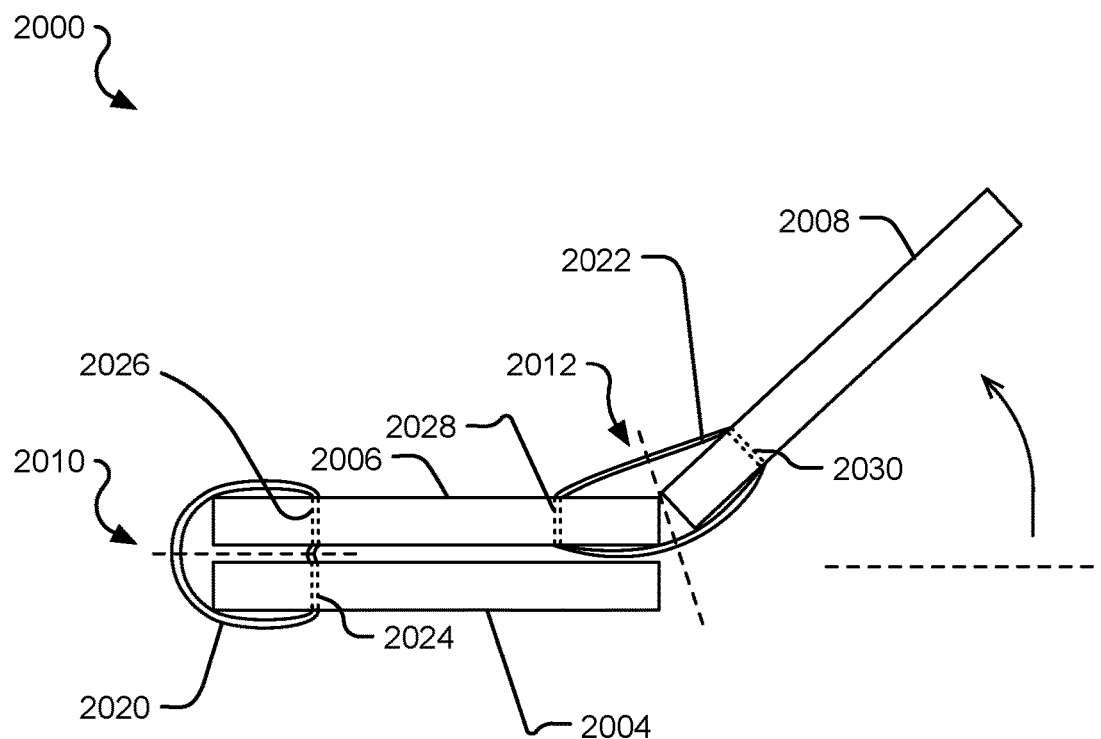
FIG. 20 illustrates another phase of z-folding operation on an example flexible membrane.

FIG. 20 illustrates another phase of z-folding operation on an example flexible membrane 2000. The flexible membrane 2000 includes semi-rigid panels (see, e.g., panels 2004, 2006, and 2008) connected by one or more shear compliant connectors (see, e.g., connectors 2020 and 2022). In one implementation, the shear compliant connectors may be in a string format connected to apertures (e.g., apertures 2024, 2026, 2028, and 2030) in the interior of each panel. In another implementation, the shear compliant connectors are configured as loop connectors that slide through apertures (e.g., apertures 2024, 2026, 2028, and 2030) along the edge and in the interior of each panel, although other shear compliant connectors implementations may be employed. Each semi-rigid panel can support zero or more devices or portions of devices.

A z-fold location 2010 is shown at the junction between adjacent panels 2004 and 2006. The panel 2004 has been folded at the z-fold location 2010 relative to the panel 2006 as the flexible membrane 2000 is being transitioned to an undeployed state and can be unfolded at the z-fold 2010 as the flexible membrane 2000 is being expanded to a deployed state. Furthermore, another z-fold location 2012 is shown at the junction between adjacent panels 2006 and 2008. The panel 2008 can be folded at the z-fold location 2012 relative to the panel 2006 as the flexible membrane 2000 is being transitioned to an undeployed state and can be unfolded at the z-fold locations 2010 and 2012 as the flexible membrane 2000 is being expanded to a deployed state.

Figure 21:
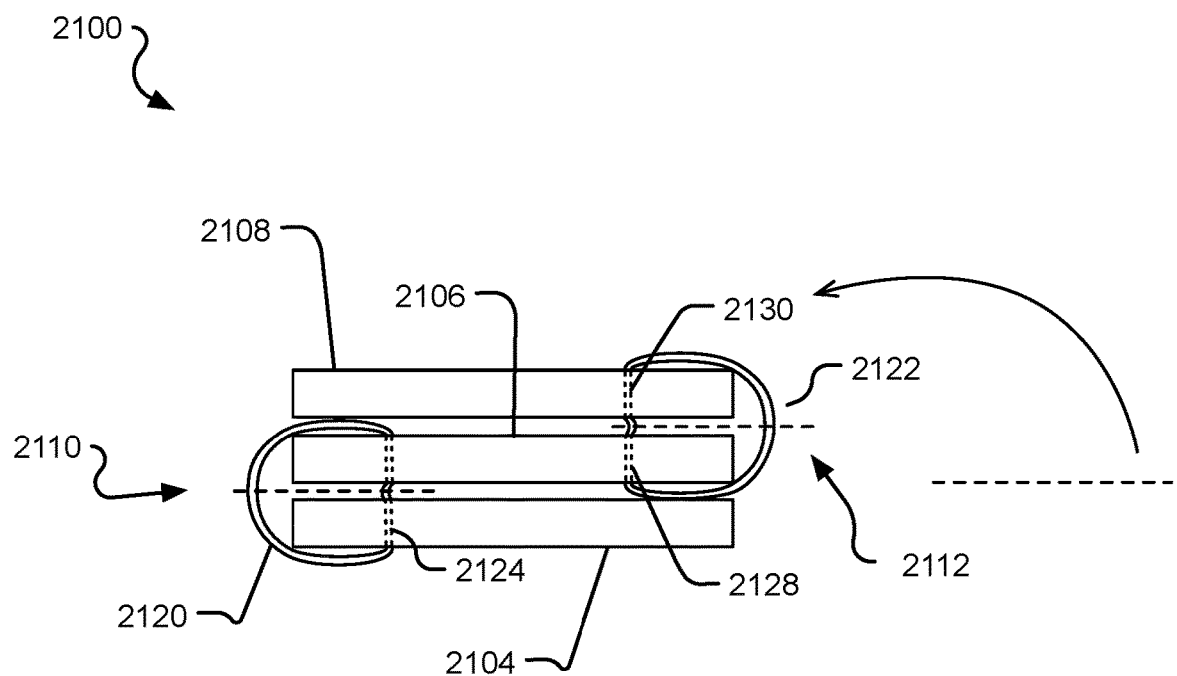
FIG. 21 illustrates yet another phase of z-folding operation on an example flexible membrane.

FIG. 21 illustrates yet another phase of z-folding operation on an example flexible membrane. The flexible membrane 2100 includes semi-rigid panels (see, e.g., panels 2104, 2106, and 2108) connected by one or more shear compliant connectors (see, e.g., connectors 2120 and 2122). In one implementation, the shear compliant connectors are configured as loop connectors that slide through apertures (e.g., apertures 2124, 2126, 2128, and 2130) along the edge and in the interior of each panel, although other shear compliant connectors implementations may be employed. Each semi-rigid panel can support zero or more devices or portions of devices.

A z-fold location 2110 is shown at the junction between adjacent panels 2104 and 2106. The panel 2104 has been folded at the z-fold location 2110 relative to the panel 2106 as the flexible membrane 2100 is being transitioned to an undeployed state and can be unfolded at the z-fold 2110 as the flexible membrane 2100 is being expanded to a deployed state. Furthermore, another z-fold location 2112 is shown at the junction between adjacent panels 2106 and 2108. The panel 2108 can be folded at the z-fold location 2112 relative to the panel 2106 as the flexible membrane 2100 is being transitioned to an undeployed state and unfolded at the z-fold locations 2110 and 2112 as the flexible membrane 2100 is being expanded to a deployed state.

In the undeployed state, the flexible membrane 2100 forms a stack of connected panels mounted on the thin continuous flexible substrate fabric 2102. In a deployed state, the flexible membrane 2100 forms an expanded and continuous membrane of connected panels mounted on the thin continuous flexible substrate fabric 2102.

Figure 22A:
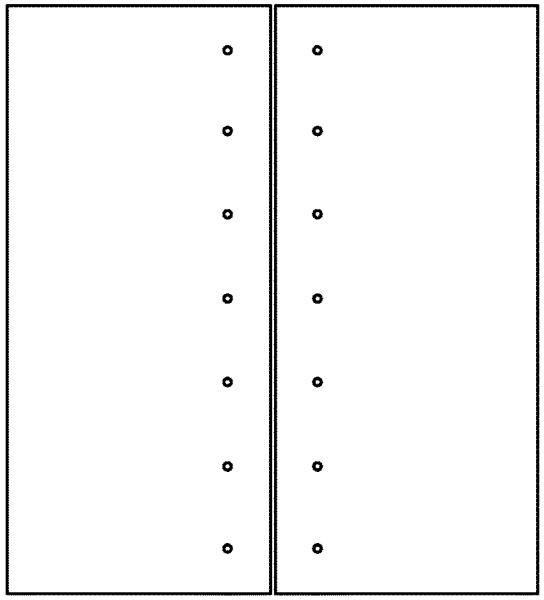
FIGS. 22A-22D illustrate panels of an example flexible membrane having shear compliant connectors.
Figure 22B:
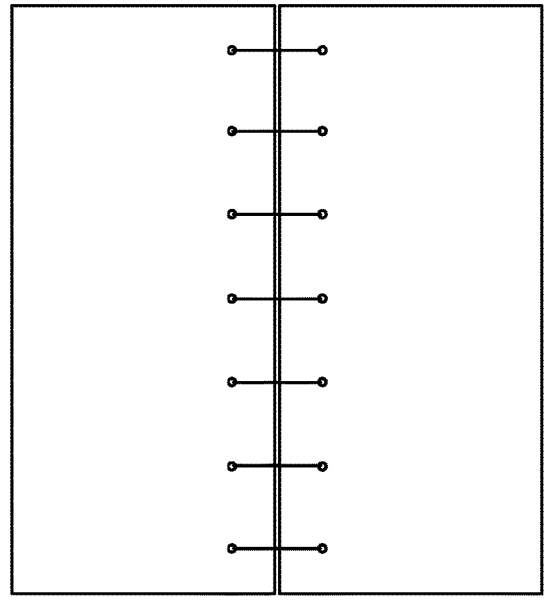
Figure 22C:
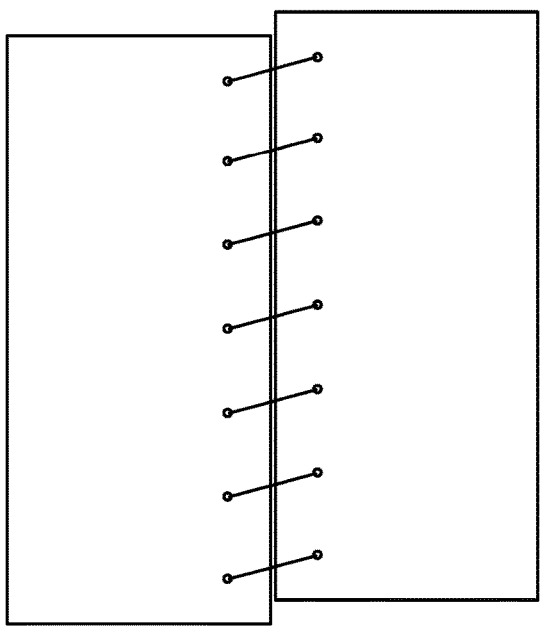
Figure 22D:
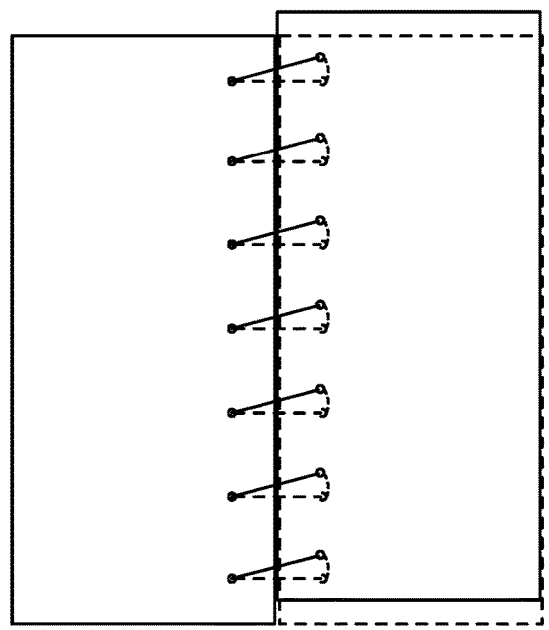

FIGS. 22A-22D illustrate panels of an example flexible membrane 2200 having shear compliant connectors 2202. With reference to FIGS. 22A and 22B, the flexible membrane 2200 has a first panel 2204 and a second panel 2206 that are separated from one another across a junction but are connected to one another by a series of flexible string elements or loop elements referred to as shear compliant connectors (see, e.g., connectors 2208 and 2210). Each of the shear compliant connectors has one end pivotally connected to the first panel 2204 via a hole or aperture extending through the first panel 2204 and another end pivotally connected to the second panel 2206 via a hole or aperture extending through the second panel 2206. The pivot connections are such that the each of the shear compliant connectors can pivot about an axis that extends through each of the holes or apertures in the panels with which each such shear compliant connector is associated and perpendicular to the plane of the undeployed panel. The flexible nature of the series of shear compliant connectors allows the connectors to act as a folding restraint that allows the first and second panels 2204 and 2206 to be Z-folded while accommodating shear that can be introduced when the flexible membrane 2200 is rolled. With reference to FIGS. 22C and 22D, the series of shear compliant connectors, due to the ability to pivot, reduces the shearing issue (see the offset positions of the panels 2204 and 2206 in FIGS. 22C and 22D) that arises upon the rolling of the flexible membrane 2200 to place the flexible membrane 2200 in an undeployed state. In another implementation, such connectors are fixed (e.g., not pivotably anchored) in their attachment to the interior region of the panels and have enough flexibility to accommodate shear motion.

As such, the string-like structures between two panels establish a hinge with a least two-degrees of rotational freedom, unlike a conventional hinge with only a single rotational degree of freedom.

Figure 23:
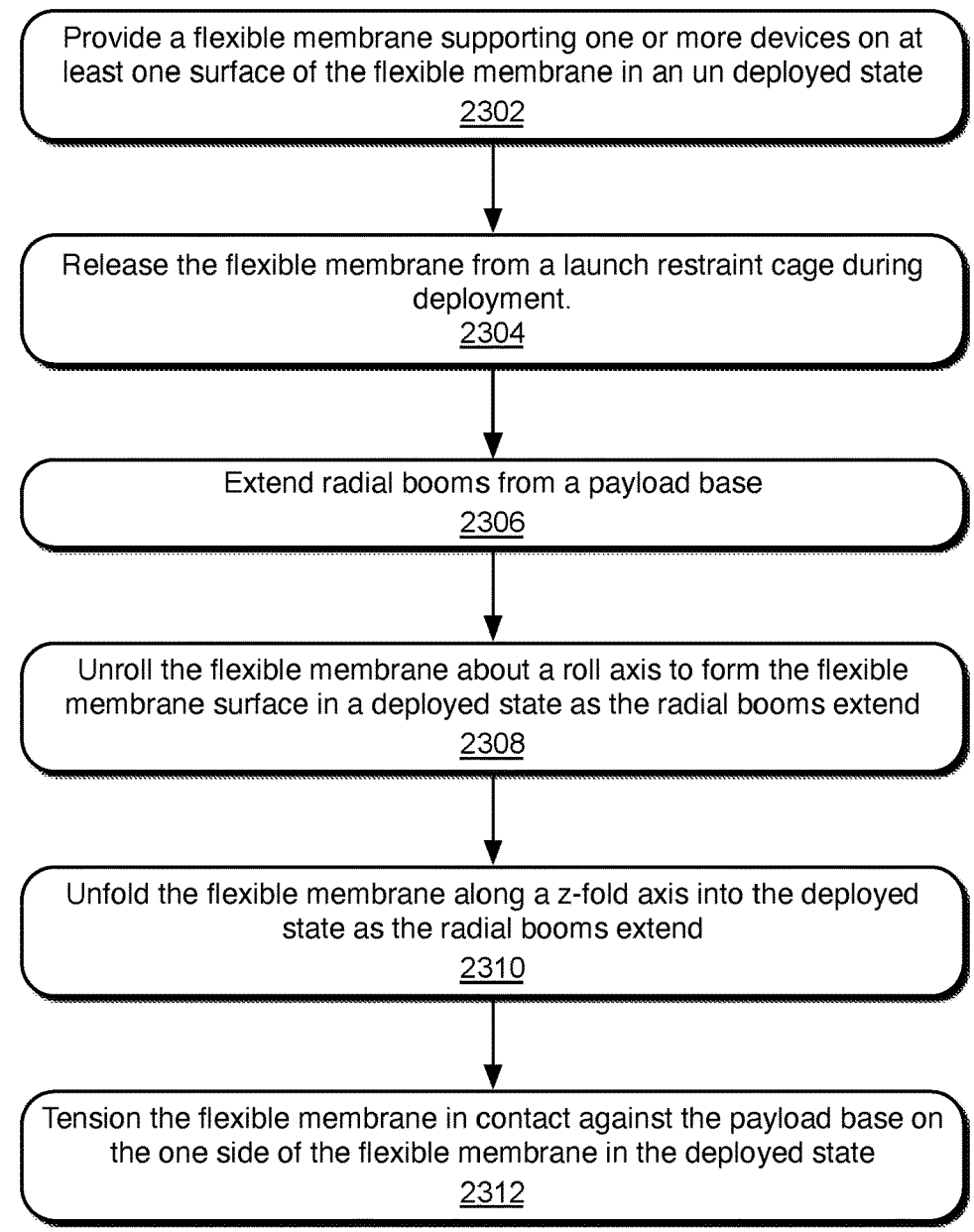
FIG. 23 illustrates example deployment operations for an example deployable system.

FIG. 23 illustrates example deployment operations 2300 for an example deployable system. A providing operation 2302 provides a flexible membrane that supports zero or more devices on at least one surface of the flexible membrane in an undeployed state. A releasing operation 2304 releases the flexible membrane from a launch restraint cage during deployment.

An extending operation 2306 begins to extend radial booms from a payload base that is coupled to the flexible membrane. An unrolling operation 2308 unrolls the flexible membrane about a roll axis to form a flexible membrane surface in a deployed state as the radial booms extend. The roll axis is substantially perpendicular to the flexible membrane surface in the deployed state. An unfolding operation 2310 unfolds the flexible membrane along a z-fold axis into the deployed state as the radial booms extend. The extending operation 2306, the unrolling operation 2308, and the unfolding operation 2310 can be performed in any order, concurrently, or partially concurrently (e.g., the unrolling operation 2308 may cease while the unfolding operation 2310 continues).

A tensioning operation 2312 tensions the flexible membrane in contact against the payload base on one side of the flexible membrane in the deployed state.

It should be understood that, in some implementation, the deployed flexible membrane is designed to be more planar, rather than less planar, so that electronic compensation can be made for deviations in the "planar-ness" of the deployed flexible membrane that is, in turn, imparted to the device or devices supported by the deployed membrane. To reduce the number and/or extent of deviations in the deployed flexible membrane, the number of z-folds in the undeployed flexible membrane may be minimized, and the outer radius of the undeployed flexible membrane may be maximized. Maximizing the radius of the undeployed flexible membrane can result in the membrane having a tubular or cylindrical geometric shape with a relatively hollow center when in an undeployed state. Such an undeployed flexible membrane can collapse inward upon itself and subsequently inhibit deployment of the flexible membrane. For example, if such a flexible membrane is disposed within the payload section of a launch vehicle, the flexible nature of the flexible membrane may allow the flexible membrane to collapse inward, particularly during launch, and subsequently inhibit deployment of the flexible membrane.

To address this issue, one embodiment of the flexible membrane may include a semi-rigid support member that is associated with the outer most panel of the membrane. The semi-rigid support member is located so that when the flexible membrane is in an undeployed state, the semi-rigid support member forms an inner wall of the cylindrical geometric shape associated with the undeployed membrane. Generally, the semi-rigid support member is significantly less flexible about an axis that is parallel to any of the z-fold axes associated with the flexible membrane and, as such, prevents the undeployed flexible membrane from collapsing inward. The semi-rigid support member can be attached to the flexible membrane or incorporated into the flexible membrane. In another embodiment, two semi-rigid support members are employed, one associated with each of the outer-most panels of the membrane. The semi-rigid support members form at least a portion of one or more inner walls of the cylindrical geometric shape. However, in one scheme of z-folding and rolling of the membrane, the use of two semi-rigid support members reduces the extent of the folding or bending needed at one location, i.e., the two semi-rigid support members allow the radius of the bend to be increased relative to the single semi-rigid support member approach.

The flexible membrane is further capable of being deployed such that the flexible membrane, whether a single, continuous membrane or a multi-piece membrane is continuous within the outer edge of the flexible membrane, i.e., there is no portion of the structure used to transition the flexible membrane from the undeployed state to the deployed state located within the boundary defined by the outer edge of the deployed membrane. Alternatively, in multiple implementations, there is no portion of the structure used to transition the membrane that penetrates the plane of the flexible membrane.

A deployment system used to deploy the flexible membrane from an undeployed state to a deployed state can take a number of forms. Generally, the deployment system includes a payload base and multiple deployable structures that are each supported by the payload base and engage the flexible membrane. The deployable structures can take a number of forms, including structures that employ "carpenter's" tape, flexible rods, telescoping rods, generally one-dimensional extendable booms, or other structures known to those skilled in the art to realize an extendable boom or truss that is employable to deploy the flexible membrane. In one embodiment, a number of extendable booms are realized using carpenter's tape to realize the longerons of the deployed boom. Each of the booms engages a location adjacent to the edge of the flexible membrane and, upon deployment, place the membrane in a tensioned state in which the membrane is substantially planar.

An example system for extraterrestrial deployment of a flexible membrane surface includes a flexible membrane having a periphery and an interior. The flexible membrane is rolled about a roll axis into a cylindrical geometric shape in an undeployed state. A payload base has extendable radial booms. Each extendable radial boom has a proximal end and a distal end with respect to the payload base, wherein the distal end of each extendable radial boom is attached to the periphery of the flexible membrane and the interior of the flexible membrane is free of attachment to the extendable radial booms. The payload base and the extendable radial booms are positioned to one side of the flexible membrane along the roll axis. The extendable radial booms are configured to extend orthogonally to the roll axis from the payload base to unroll the flexible membrane about the roll axis to form the flexible membrane surface in a deployed state, wherein the roll axis is substantially orthogonal to the flexible membrane surface.

Another example system of any preceding system is provided, wherein the flexible membrane is further folded along a z-fold axis that is orthogonal to the roll axis in the undeployed state, wherein the extendable radial booms are further configured to unfold the flexible membrane along the z-fold axis into the deployed state.

Another example system of any preceding system is provided, wherein the flexible membrane is unfolded and unrolled concurrently during at least a portion of deployment.

Another example system of any preceding system is provided, wherein the flexible membrane is expanded into the deployed state by the extendable radial booms at the one side of the flexible membrane, wherein the flexible membrane is in contact with the payload base on the one side of the flexible membrane in the deployed state.

Another example system of any preceding system is provided, wherein the flexible membrane is expanded into the deployed state by the extendable radial booms at the one side of the flexible membrane, wherein the flexible membrane is tensioned against the payload base on the one side of the flexible membrane in the deployed state.

Another example system of any preceding system is provided, wherein the flexible membrane is formed from a plurality of semi-rigid panels, each semi-rigid panel being rollable with respect to the roll axis and being connected to at least one other semi-rigid panel.

Another example system of any preceding system is provided, wherein each semi-rigid panel has a periphery and an interior region within the periphery and is connected to at least one other semi-rigid panel by a shear compliant connector pivotally attached to the interior region of each connected semi-rigid panel.

Another example system of any preceding system is provided, wherein the flexible membrane is further folded along a z-fold axis that is orthogonal to the roll axis in the undeployed state, each fold in the flexible membrane being positioned at a junction between at least two adjacent semi-rigid panels.

Another example system of any preceding system is provided, wherein each semi-rigid panel is connected to at least one other semi-rigid panel by a flexible substrate fabric, each semi-rigid panel being attached to the flexible substrate fabric.

Another example system of any preceding system is provided, wherein the flexible substrate fabric is thinner and more flexible than each of the semi-rigid panels.

Another example system of any preceding system is provided, wherein the flexible substrate fabric is continuous across the flexible membrane.

Another example system of any preceding system is provided, wherein the flexible substrate fabric is shear compliant.

Another example system of any preceding system is provided, wherein the flexible substrate fabric includes perforations along one or more z-fold.

Another example system of any preceding system is provided, wherein the flexible membrane is rolled about the roll axis in a single radial direction in the undeployed state to form the cylindrical geometric shape.

Another example system of any preceding system is provided, wherein the cylindrical geometric shape has an interior with an interior radius, and the flexible membrane is rolled about a small-radius loop of the flexible membrane at the interior of the cylindrical geometric shape in the undeployed state, the small-radius loop having a radius that is smaller than the interior radius of the cylindrical geometric shape.

Another example system of any preceding system is provided, wherein the payload base includes a synchronization pin that extends into the small-radius loop of the flexible membrane in the undeployed state.

Another example system of any preceding system is provided, wherein the flexible membrane includes at least one semi-rigid support member that forms at least part of an interior surface of the cylindrical geometric shape in the undeployed state.

Another example system of any preceding system is provided, wherein the cylindrical geometric shape has an interior with an interior radius, and the flexible membrane is rolled about two small-radius loops in the flexible membrane at the interior of the cylindrical geometric shape in the undeployed state, the small-radius loops facing in opposite directions and having radii that are smaller than the interior radius of the cylindrical geometric shape.

Another example system of any preceding system is provided, wherein the payload base includes at least two synchronization pins, each synchronization pin extending into a different one of the two small-radius loops of the flexible membrane in the undeployed state.

Another example system of any preceding system is provided, wherein the flexible membrane includes at least two semi-rigid support members that form at least part of an interior surface of the cylindrical geometric shape in the undeployed state.

Another example system of any preceding system is provided, further including a launch restraint cage enclosing the flexible membrane under load while in the undeployed state and configured to release the flexible membrane during deployment.

Another example system of any preceding system is provided, further including an extendable orthogonal boom being configured to extend parallel to the roll axis from the payload base in the deployed state.

Another example system of any preceding system is provided, further including one or more lanyards connecting the extendable orthogonal boom to one or more of the extendable radial booms.

Another example system of any preceding system is provided, wherein the flexible membrane is continuous within its periphery in the deployed state.

Another example system of any preceding system is provided, wherein the flexible membrane supports one or more devices on at least one surface of the flexible membrane.

Another example system of any preceding system is provided, wherein the payload base is configured to synchronize a rate of unrolling of the flexible membrane and a rate of unfolding of the flexible membrane as the extendable radial booms extend during deployment.

An example method of extraterrestrial deployment of a flexible membrane surface includes providing a flexible membrane having a periphery and an interior, wherein the flexible membrane is rolled about a roll axis into a cylindrical geometric shape in an undeployed state. The example method also includes extending radial booms from a payload base, each radial boom having a proximal end and a distal end with respect to the payload base, wherein the distal end of each radial boom is attached to the periphery of the flexible membrane and the interior of the flexible membrane is free of attachment to the radial booms. The payload base and the radial booms are positioned to one side of the flexible membrane along the roll axis. The radial booms extend orthogonally to the roll axis from the payload base. The example method also includes unrolling the flexible membrane about the roll axis to form the flexible membrane surface in a deployed state, wherein the roll axis is substantially orthogonal to the flexible membrane surface.

Another example method of any preceding method is provided, wherein the flexible membrane is further folded along a z-fold axis that is orthogonal to the roll axis in the undeployed state, and the example method further includes unfolding the flexible membrane along the z-fold axis into the deployed state as the radial booms extend.

Another example method of any preceding method is provided, wherein the flexible membrane is unfolded and unrolled concurrently during at least a portion of deployment.

Another example method of any preceding method is provided, further includes synchronizing a rate of unrolling and a rate of unfolding as the radial booms extend during deployment.

Another example method of any preceding method is provided, wherein the flexible membrane is expanded into the deployed state by the radial booms at the one side of the flexible membrane, and further including tensioning the flexible membrane in contact with the payload base on the one side of the flexible membrane in the deployed state.

Another example method of any preceding method is provided, wherein a launch restraint cage encloses the flexible membrane under load while in the undeployed state, and further including releasing the flexible membrane from the launch restraint cage during deployment.

Another example method of any preceding method is provided, wherein the flexible membrane is continuous within its periphery in the deployed state.

Another example method of any preceding method is provided, wherein the flexible membrane supports one or more devices on at least one surface of the flexible membrane.

Another example system for extraterrestrial deployment of a flexible membrane surface includes a flexible membrane having a periphery and an interior, wherein the flexible membrane is rolled about a roll axis into a cylindrical geometric shape in an undeployed state. The example system also includes means for extending radial booms from a payload base, each radial boom having a proximal end and a distal end with respect to the payload base, wherein the distal end of each radial boom is attached to the periphery of the flexible membrane and the interior of the flexible membrane is free of attachment to the radial booms, the payload base and the radial booms being positioned to one side of the flexible membrane along the roll axis, the radial booms extending orthogonally to the roll axis from the payload base. The example system also includes means for unrolling the flexible membrane about the roll axis to form the flexible membrane surface in a deployed state, wherein the roll axis is substantially orthogonal to the flexible membrane surface.

While this specification contains many specific implementation details, these should not be construed as limitations on the scope of any inventions or of what may be claimed, but rather as descriptions of features specific to particular embodiments of a particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

A number of implementations of the described technology have been described. Nevertheless, it will be understood that various modifications can be made without departing from the spirit and scope of the recited claims.

What is claimed is:

1. A system for extraterrestrial deployment of a flexible membrane surface comprising:
   a flexible membrane having a periphery and an interior, the flexible membrane being rolled about a roll axis into a cylindrical geometric shape in an undeployed state; and
   a payload base having extendable radial booms, each extendable radial boom having a proximal end and a distal end with respect to the payload base, wherein the distal end of each extendable radial boom is attached to the periphery of the flexible membrane and the interior of the flexible membrane is free of attachment to the extendable radial booms, the payload base and the extendable radial booms positioned to one side of the flexible membrane along the roll axis, the extendable radial booms configured to extend orthogonally relative to the roll axis and diagonally relative to a z-fold axis from the payload base to unroll the flexible membrane about the roll axis and to unfold the flexible membrane along the z-fold axis to form the flexible membrane surface in a deployed state, wherein the roll axis is substantially orthogonal to the flexible membrane surface.

2. The system of claim 1, wherein the flexible membrane is further folded along the z-fold axis that is orthogonal to the roll axis in the undeployed state, wherein the extendable radial booms are further configured to unfold the flexible membrane along the z-fold axis into the deployed state.

3. The system of claim 2, wherein the flexible membrane is unfolded and unrolled concurrently during at least a portion of deployment.

4. The system of claim 1, wherein the flexible membrane is expanded into the deployed state by the extendable radial booms at the one side of the flexible membrane, wherein the flexible membrane is in contact with the payload base on the one side of the flexible membrane in the deployed state.

5. The system of claim 1, wherein the flexible membrane is expanded into the deployed state by the extendable radial booms at the one side of the flexible membrane, wherein the flexible membrane is tensioned against the payload base on the one side of the flexible membrane in the deployed state.

6. The system of claim 1, wherein the flexible membrane is formed from a plurality of semi-rigid panels, each semi-rigid panel rollable with respect to the roll axis and connected to at least one other semi-rigid panel.

7. The system of claim 6, wherein each semi-rigid panel has a periphery and an interior region within the periphery and is connected to at least one other semi-rigid panel by a shear compliant connector pivotally attached to the interior region of each connected semi-rigid panel.

8. The system of claim 6, wherein the flexible membrane is further folded along the z-fold axis that is orthogonal to the roll axis in the undeployed state, each fold in the flexible membrane positioned at a junction between at least two adjacent semi-rigid panels.

9. The system of claim 6, wherein each semi-rigid panel is connected to at least one other semi-rigid panel by a flexible substrate fabric, each semi-rigid panel attached to the flexible substrate fabric.

10. The system of claim 9, wherein the flexible substrate fabric is thinner and more flexible than each of the plurality of semi-rigid panels.

11. The system of claim 9, wherein the flexible substrate fabric is continuous across the flexible membrane.

12. The system of claim 9, wherein the flexible substrate fabric is shear compliant.

13. The system of claim 9, wherein the flexible substrate fabric includes perforations along one or more z-fold.

14. The system of claim 1, wherein the flexible membrane is rolled about the roll axis in a single radial direction in the undeployed state to form the cylindrical geometric shape.

15. The system of claim 14, wherein the cylindrical geometric shape has an interior with an interior radius, and the flexible membrane is rolled about a small-radius loop of the flexible membrane at the interior of the cylindrical geometric shape in the undeployed state, the small-radius loop having a radius that is smaller than the interior radius of the cylindrical geometric shape.

16. The system of claim 15, wherein the payload base includes a synchronization pin that extends into the small-radius loop of the flexible membrane in the undeployed state.

17. The system of claim 15, wherein the flexible membrane includes at least one semi-rigid support member that forms at least part of an interior surface of the cylindrical geometric shape in the undeployed state.

18. The system of claim 14, wherein the cylindrical geometric shape has an interior with an interior radius, and the flexible membrane is rolled about two small-radius loops in the flexible membrane at the interior of the cylindrical geometric shape in the undeployed state, the two small-radius loops facing in opposite directions and having radii that are smaller than the interior radius of the cylindrical geometric shape.

19. The system of claim 18, wherein the payload base includes at least two synchronization pins, each synchronization pin extending into a different one of the two small-radius loops of the flexible membrane in the undeployed state.

20. The system of claim 18, wherein the flexible membrane includes at least two semi-rigid support members that form at least part of an interior surface of the cylindrical geometric shape in the undeployed state.

21. The system of claim 1, further comprising:
a launch restraint cage enclosing the flexible membrane under load while in the undeployed state and configured to release the flexible membrane during deployment.

22. The system of claim 1, further comprising:
an extendable orthogonal boom configured to extend parallel to the roll axis from the payload base in the deployed state.

23. The system of claim 22, further comprising:
one or more lanyards connecting the extendable orthogonal boom to one or more of the extendable radial booms.

24. The system of claim 1, wherein the flexible membrane is continuous within its periphery in the deployed state.

25. The system of claim 1, wherein the flexible membrane supports one or more devices on at least one surface of the flexible membrane.

26. The system of claim 1, wherein the payload base is configured to synchronize a rate of unrolling of the flexible membrane and a rate of unfolding of the flexible membrane as the extendable radial booms extend during deployment.

27. A method of extraterrestrial deployment of a flexible membrane surface comprising:
providing a flexible membrane having a periphery and an interior, wherein the flexible membrane is rolled about a roll axis into a cylindrical geometric shape in an undeployed state;
extending radial booms from a payload base, each radial boom having a proximal end and a distal end with respect to the payload base, wherein the distal end of each radial boom is attached to the periphery of the flexible membrane and the interior of the flexible membrane is free of attachment to the radial booms, the payload base and the radial booms positioned to one side of the flexible membrane along the roll axis, the radial booms extending orthogonally relative to the roll axis and diagonally relative to a z-fold axis from the payload base;
unrolling the flexible membrane about the roll axis; and
unfolding the flexible membrane along the z-fold axis that is substantially orthogonal relative to the roll axis, wherein the operation of unrolling and the operation of unfolding form the flexible membrane surface in a deployed state, wherein the roll axis is substantially orthogonal to the flexible membrane surface.

28. The method of claim 27, wherein the flexible membrane is further folded along the z-fold axis that is orthogonal to the roll axis in the undeployed state, and further comprising:
unfolding the flexible membrane along the z-fold axis into the deployed state as the radial booms extend.

29. The method of claim 28, wherein the flexible membrane is unfolded and unrolled concurrently during at least a portion of deployment.

30. The method of claim 27, further comprising:
synchronizing a rate of unrolling and a rate of unfolding as the radial booms extend during deployment.

31. The method of claim 27, wherein the flexible membrane is expanded into the deployed state by the radial booms at the one side of the flexible membrane, and further comprising:
tensioning the flexible membrane in contact with the payload base on the one side of the flexible membrane in the deployed state.

32. The method of claim 27, wherein a launch restraint cage encloses the flexible membrane under load while in the undeployed state, and further comprising:
releasing the flexible membrane from the launch restraint cage during deployment.

33. The method of claim 27, wherein the flexible membrane is continuous within its periphery in the deployed state.

34. The method of claim 27, wherein the flexible membrane supports one or more devices on at least one surface of the flexible membrane.

35. A system for extraterrestrial deployment of a flexible membrane surface comprising:
a flexible membrane having a periphery and an interior, wherein the flexible membrane is rolled about a roll axis into a cylindrical geometric shape in an undeployed state;
means for extending radial booms from a payload base, each radial boom having a proximal end and a distal end with respect to the payload base, wherein the distal end of each radial boom is attached to the periphery of the flexible membrane, and the interior of the flexible membrane is free of attachment to the radial booms, the payload base and the radial booms positioned to one side of the flexible membrane along the roll axis, the radial booms extending orthogonally relative to the roll axis and diagonally relative to a z-fold axis from the payload base; and
means for unrolling the flexible membrane about the roll axis to form the flexible membrane surface in a deployed state, wherein the roll axis is substantially orthogonal to the flexible membrane surface,
wherein the flexible membrane is further folded along the z-fold axis that is orthogonal relative to the roll axis before the flexible membrane is rolled in the undeployed state.

* * * * *